(12) United States Patent
Yasui et al.

(10) Patent No.: US 7,158,874 B2
(45) Date of Patent: Jan. 2, 2007

(54) CONTROLLER

(75) Inventors: Yuji Yasui, Saitama-ken (JP); Koichiro Shinozaki, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/329,026

(22) Filed: Jan. 11, 2006

(65) Prior Publication Data
US 2006/0173604 A1  Aug. 3, 2006

(30) Foreign Application Priority Data
Jan. 31, 2005  (JP) .............................. 2005-023614

(51) Int. Cl.
  *F02D 41/14* (2006.01)
  *F02D 45/00* (2006.01)
  *G05B 13/04* (2006.01)
  *G06F 19/00* (2006.01)
(52) U.S. Cl. .................... 701/103; 123/90.15; 701/110
(58) Field of Classification Search ................ 701/103, 701/102, 110, 114, 115; 123/90.15, 90.17
See application file for complete search history.

(56) References Cited

U.S. PATENT DOCUMENTS 5,638,788 A * 6/1997 Sanvido et al. ............. 701/115
6,186,124 B1 * 2/2001 Stefanopoulou et al. .... 123/399
2004/0236492 A1  11/2004 Yasui et al.

FOREIGN PATENT DOCUMENTS

| EP | 0 850 816 A2 | 7/1998 |
|----|--------------|--------|
| EP | 0 850 816 A3 | 7/1998 |
| EP | 1 422 584 A1 | 5/2004 |
| EP | 1 484 654 A2 | 12/2004 |
| JP | 2004-248411 A * | 9/2004 |

* cited by examiner

*Primary Examiner*—Hieu T. Vo
(74) *Attorney, Agent, or Firm*—Arent Fox PLLC

(57) ABSTRACT

A controller which is capable of maintaining stability of a control system even if the dynamic characteristic of a controlled object temporarily changes sharply in the case where a controlled object model is used. An ECU of the controller calculates a first disturbance estimate by carrying out a low-pass filtering process and a rate limiting process on a first estimation error as the difference between a fuel pressure estimate calculated with an estimation algorithm and a fuel pressure. Then, the ECU calculates a second disturbance estimate based on a second estimation error as the difference between the first estimation error and the first disturbance estimate, with a predetermined disturbance estimation algorithm. Further, the ECU calculates a fuel pressure control input based on the fuel pressure and the first and second disturbance estimates, with a predetermined control algorithm.

7 Claims, 19 Drawing Sheets

NE

Ploss

CONTROLLER

BACKGROUND OF THE INVENTION

1. Field of the Invention

The present invention relates to a controller for controlling a controlled object with a control algorithm based on a controlled object model.

2. Description of the Related Art

Conventionally, a controller of the above-mentioned kind has been disclosed in Japanese Laid-Open Patent Publication (Kokai) No. 2002-287804. This controller includes a disturbance observer, a sliding mode controller, and a reference model. In the controller, a disturbance estimate and an estimate of a state amount are calculated by the disturbance observer based on a controlled object model, and a reference value of the state amount is calculated based on the reference model. Then, a control input to a controlled object is calculated by the sliding mode controller based on the disturbance estimate, the state amount estimate, and the state amount reference value, such that the difference between the state amount reference value and the state amount estimate converges to a value of 0.

In general, in the case where a controlled object is controlled with a control algorithm based on a controlled object model, if the dynamic characteristic of the controlled object temporarily changes sharply due to a disturbance, a sudden change in a target value, or the like, an excessively large modeling error can occur. When such a modeling error occurs in the conventional controller, since it uses the disturbance observer, the excessively large modeling error is directly reflected in the disturbance estimate, and as a consequence, the difference between the state amount reference value and the state amount estimate might exhibit an oscillatory swing-back behavior or temporarily become excessively large. In short, there is a fear that the control system might become unstable.

SUMMARY OF THE INVENTION

It is an object of the present invention to provide a controller which is capable of maintaining stability of a control system even if the dynamic characteristic of a controlled object temporarily changes sharply in the case where a controlled object model is used.

To attain the above object, the present invention provides a controller comprising control amount-detecting means for detecting a control amount of a controlled object, target control amount-setting means for setting a target control amount as a target of the control amount, estimated control amount-calculating means for calculating an estimate of the control amount as an estimated control amount, with a predetermined estimation algorithm based on a controlled object model obtained by modeling the controlled object, first disturbance estimate-calculating means for calculating a first disturbance estimate by carrying out processing including at least one of a predetermined filtering process, a predetermined limiting process, and a predetermined gain-setting process on a first difference as a difference between the detected control amount and the calculated estimated control amount, second disturbance estimate-calculating means for calculating a second disturbance estimate based on a second difference as a difference between the first difference and the calculated first disturbance estimate, with a predetermined disturbance estimation algorithm, and control input-calculating means for calculating a control input to the controlled object based on the calculated first disturbance estimate, the calculated second disturbance estimate, and the detected control amount, with a predetermined control algorithm, such that the control amount converges to the target control amount.

With the configuration of this controller, the control input to the controlled object is calculated based on the calculated first disturbance estimate, the calculated second disturbance estimate, and the detected control amount, with the predetermined control algorithm, such that the control amount converges to the target control amount. Therefore, it is possible to compensate for a modeling error of the controlled object by the first and second disturbance estimates. In this case, the first disturbance estimate is calculated by carrying out the processing including at least one of the predetermined filtering process, the predetermined limiting process, and the predetermined gain-setting process on the first difference as the difference between the detected control amount and the calculated estimated control amount. Therefore, by appropriately setting at least one of the filtering characteristic, the limiting characteristic, and the gain of the process performed on the first difference, it is possible to compensate for the modeling error by the first disturbance estimate when the first difference is relatively small, or more specifically, when a change in the dynamic characteristic of the controlled object is relatively small, and hence the modeling error of the controlled object model is small, or when there exists a modeling error like a steady-state deviation.

Further, since the second disturbance estimate is calculated based on the second difference as the difference between the first difference and the first disturbance estimate, with the predetermined disturbance estimation algorithm, even when the first difference temporarily changes sharply, or more specifically, even when the dynamic characteristic of the controlled object temporarily changes sharply, causing an excessively large modeling error which cannot be compensated for by the first disturbance estimate alone, it is possible to compensate for the excessively large modeling error by using not only the first disturbance estimate but also the second disturbance estimate. As a consequence, even when the dynamic characteristic of the controlled object temporarily changes sharply, it is possible to cause the control amount to converge to the target control amount while avoiding oscillatory swing-back behavior and overshoot of the control amount with respect to the target control amount. In short, the stability of the control system and high control accuracy thereof can be ensured (it should be noted that in the present specification, "detection of the control amount" includes not only direct detection of the control amount by a sensor or the like, but also computation of the control amount).

Preferably, the controller of the present invention further comprises model parameter-setting means for setting model parameters of the controlled object model according to a state of the controlled object, and the control input-calculating means calculates the control input further based on the set parameters, with the predetermined control algorithm.

With the configuration of this preferred embodiment, the model parameters of the controlled object model are set according to the state of the controlled object, and the control input is calculated further based on the set parameters. Therefore, even when the dynamic characteristic of the controlled object changes with a change in the state of the controlled object, it is possible to cause the change in the dynamic characteristic of the controlled object to be appropriately reflected in the controlled object model, thereby calculating the control input more properly. This makes it possible to further enhance the stability and control accuracy of the control system.

Preferably, the controller of the present invention further comprises identification means for identifying model parameters of the controlled object model with a predetermined sequential identification algorithm, and the control input-calculating means calculates the control input further based on the identified parameters, with the predetermined control algorithm.

With the configuration of this preferred embodiment, the model parameters of the controlled object model are identified with the predetermined sequential identification algorithm, and the control input is calculated further based on the identified parameters. Therefore, even when the dynamic characteristic of the controlled object changes not only due to a disturbance or a sudden change in the target control amount, but also due to aging of the controlled object, it is possible to cause the change in the dynamic characteristic of the controlled object to be appropriately reflected in the controlled object model. This makes it possible to further enhance the stability and control accuracy of the control system.

Preferably, the predetermined disturbance estimation algorithm includes a forgetting algorithm for imparting a forgetting effect to the second disturbance estimate.

In the case of compensating for a modeling error by the first disturbance estimate and the second disturbance estimate, if the second disturbance estimate is calculated with a disturbance estimation algorithm containing an integral structure, there is a possibility that the control amount exhibits an oscillatory swing-back behavior with respect to the target control amount due to the integral structure contained in the disturbance estimation algorithm. In contrast, with the configuration of this preferred embodiment, since the forgetting algorithm imparts the forgetting effect to the second disturbance estimate, even when the integral structure is contained in the disturbance estimation algorithm, it is possible to avoid occurrence of the oscillatory swing-back behavior, thereby further enhancing the stability of the control system.

Preferably, the control amount is a fuel pressure in a fuel supply system of an internal combustion engine.

With the configuration of this preferred embodiment, it is possible to enhance the stability and control accuracy of the control system controlling the fuel pressure, as in the above described preferred embodiments.

Alternatively, the control amount is a cam phase of at least one of an intake cam and an exhaust cam of an internal combustion engine, for opening and closing an intake valve and an exhaust valve, respectively, with respect to a crankshaft.

With the configuration of this preferred embodiment, it is possible to enhance the stability and control accuracy of the control system controlling the cam phase, as in the above described preferred embodiments.

Alternatively, the control amount is a rotational speed of an internal combustion engine.

With the configuration of this preferred embodiment, it is possible to enhance the stability and control accuracy of the control system controlling the engine speed, as in the above described preferred embodiments.

The above and other objects, features, and advantages of the present invention will become more apparent from the following detailed description taken in conjunction with the accompanying drawings.

DETAILED DESCRIPTION OF PREFERRED EMBODIMENTS

Figure 1:
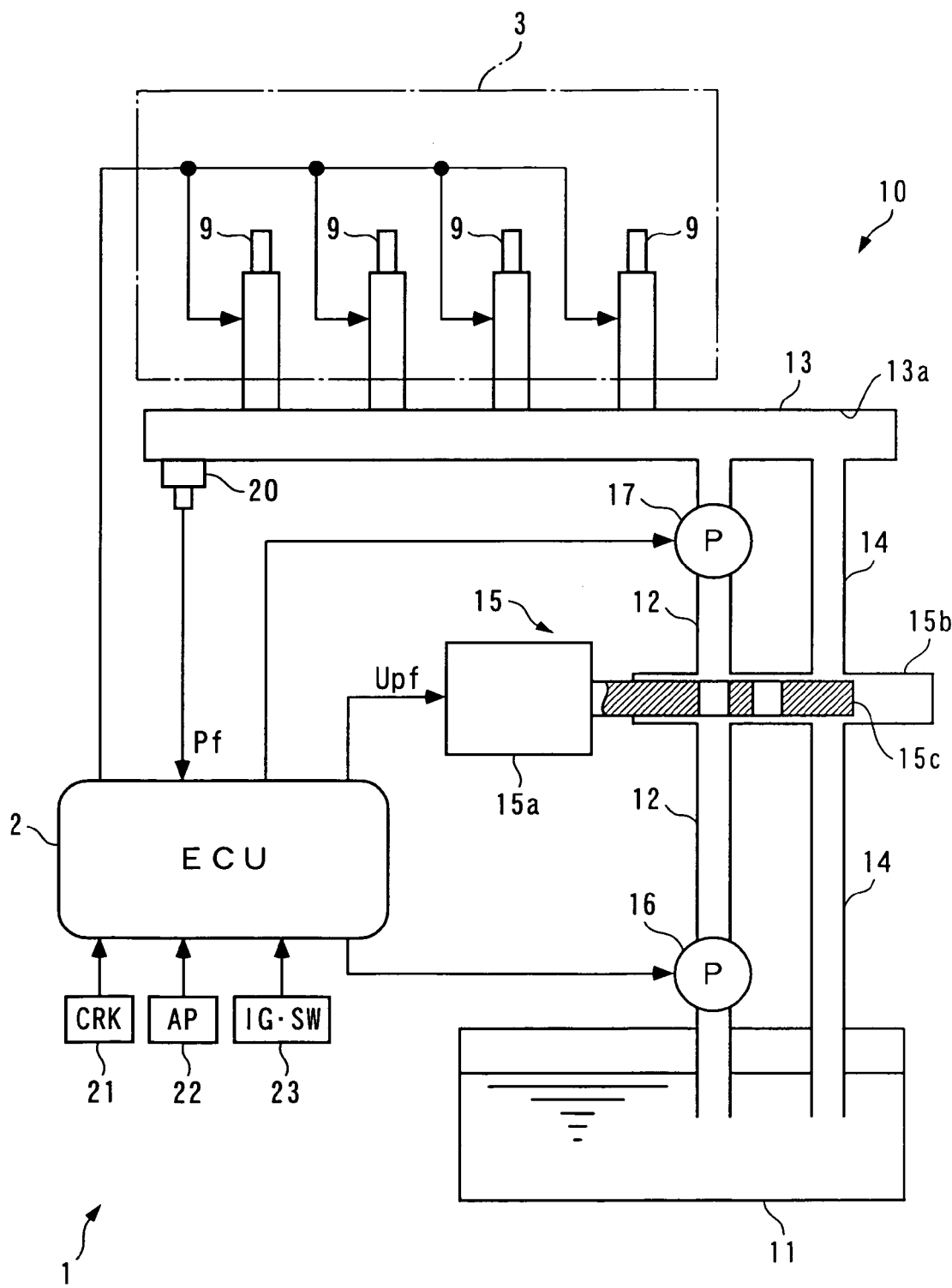
FIG. 1 is a diagram schematically showing the arrangement of a fuel supply system to which is applied a controller according to a first embodiment of the present embodiment.

The present invention will now be described in detail with reference to the drawings showing preferred embodiments thereof. Referring first to FIG. 1, there is schematically shown the arrangement of a fuel supply system 10 to which is applied a controller 1 according to a first embodiment of the present embodiment. As shown in FIG. 1, the controller 1 includes an ECU 2 which carries out control processes, such as a fuel pressure control process, described in detail hereinafter.

The fuel supply system 10 (fuel supply system) is applied to a straight type four-cylinder internal combustion engine 3 (hereinafter simply referred to as "the engine 3"), and supplies high-pressure fuel (gasoline) to four fuel injection valves 9 during operation of the engine 3. The fuel supply system 10 includes a fuel tank 11, a delivery pipe 13 connected to the fuel tank 11 via a fuel supply passage 12 and a fuel return passage 14, and a solenoid control valve 15 for opening and closing the fuel supply passage 12 and the fuel return passage 14.

The fuel supply passage 12 is provided with a low-pressure pump 16 and a high-pressure pump 17. The low-pressure pump 16 is an electric pump whose operation is controlled by the ECU 2. The low-pressure pump 16 is constantly controlled during operation of the engine 3 to pressurize fuel within the fuel tank 11 to a predetermined pressure (e.g. 0.5 MPa) and deliver the pressurized fuel toward the high-pressure pump 17.

The high-pressure pump 17 is connected to a crankshaft, not shown. The high-pressure pump 17 further pressurizes the fuel from the low-pressure pump 16 in accordance with rotation of the crankshaft, and delivers the fuel toward the delivery pipe 13.

The delivery pipe 13 has an inner space formed as a fuel chamber 13a for storing the fuel from the high-pressure pump 17 in a high-pressure state. The aforementioned four fuel injection valves 9 and a fuel pressure sensor 20 are mounted to the delivery pipe 13, and when each fuel injection valve 9 is opened, the fuel within the fuel chamber 13a is injected into a combustion chamber, not shown, of the engine 3.

The fuel pressure sensor 20 is electrically connected to the ECU 2, and detects a fuel pressure Pf within the fuel chamber 13a to output an electric signal indicative of the sensed fuel pressure Pf to the ECU 2. It should be noted that in the present embodiment, the fuel pressure sensor 20 corresponds to control amount-detecting means, and the fuel pressure Pf corresponds to a control amount.

Figure 2C:
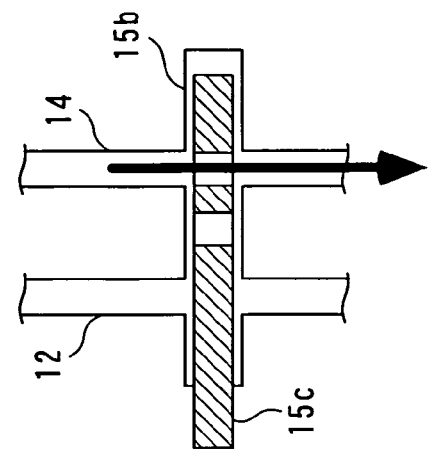
FIGS. 2A to 2C are views showing operating states of a spool valve mechanism.
Figure 2B:
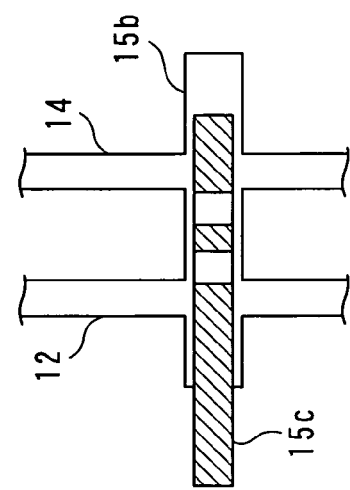
Figure 2A:
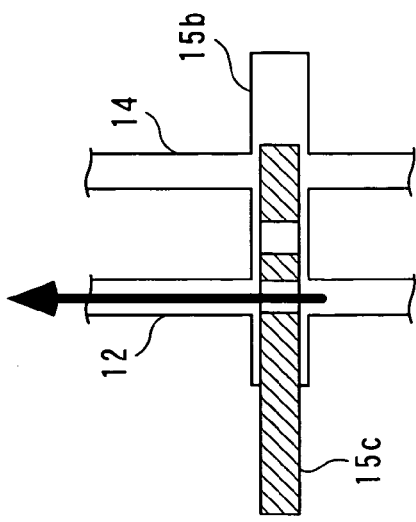

The solenoid control valve 15 is of a type formed by combining a solenoid actuator 15a and a spool valve mechanism 15b, and is connected to the ECU 2. The solenoid actuator 15a is controlled by a fuel pressure control input Upf, described in detail hereinafter, from the ECU 2 to drive a valve element 15c of the spool valve mechanism 15b such that the valve element 15c is moved between a pressure increasing position shown in FIG. 2A, a pressure holding position shown in FIG. 2B, and a pressure reducing position shown in FIG. 2C.

In the fuel supply system 10, when the solenoid control valve 15 is controlled to the pressure increasing position, the valve element 15c opens the fuel supply passage 12 and closes the fuel return passage 14. On the other hand, when the solenoid control valve 15 is controlled to the pressure reducing position, the valve element 15c closes the fuel supply passage 12 and opens the fuel return passage 14. Further, when the solenoid control valve 15 is controlled to the pressure holding position, the fuel supply passage 12 and the fuel return passage 14 are both closed by the valve element 15c.

With the above described arrangement, in the fuel supply system 10, the position of the valve element 15c of the solenoid control valve 15 is controlled by the ECU 2, whereby the fuel pressure Pf is controlled as described hereinafter.

Also connected to the ECU 2 are a crank angle sensor 21, an accelerator pedal opening sensor 22, and an ignition switch sensor (hereinafter referred to as "the IG•SW") 23. The crank angle sensor 21 (control amount-detecting means) is comprised of a magnet rotor and an MRE pickup, and delivers a CRK signal, which is a pulse signal, to the ECU 2 along with rotation of the crankshaft of the engine 3. Each pulse of the CRK signal is generated whenever the crankshaft rotates through a predetermined crank angle (e.g. 10°), and the ECU 2 calculates rotational speed NE of the engine 3 (hereinafter referred to as "the engine speed NE") based on the CRK signal.

Further, the accelerator pedal opening sensor 22 detects an amount of operation, i.e. a stepped-on amount (hereinafter referred to as "the accelerator pedal opening") AP of an accelerator pedal, not shown, of a vehicle on which the engine 3 is installed, and delivers a signal indicative of the detected accelerator pedal opening AP to the ECU 2. The IG•SW 23 is turned on and off by operation of an ignition key, not shown, and delivers a signal indicative of its ON/OFF state to the ECU 2.

The ECU 2 is implemented by a microcomputer including a CPU, a RAM, a ROM, and an I/O interface, none of which are shown. The ECU 2 controls the fuel pressure Pf via the high-pressure pump 17 and the solenoid valve 15 based on the detection signals delivered from the above-mentioned sensors 20 to 22 and the output signal from the IG•SW 23. Further, the ECU 2 carries out fuel injection control via the fuel injection valves 9, and performs ignition timing control via an ignition plug, not shown.

It should be noted that in the present embodiment, the ECU 2 corresponds to the control amount-detecting means, target control amount-setting means, estimated control amount-calculating means, first disturbance estimate-calculating means, second disturbance estimate-calculating means, control input-calculating means, model parameter-setting means, and identification means.

Figure 3:
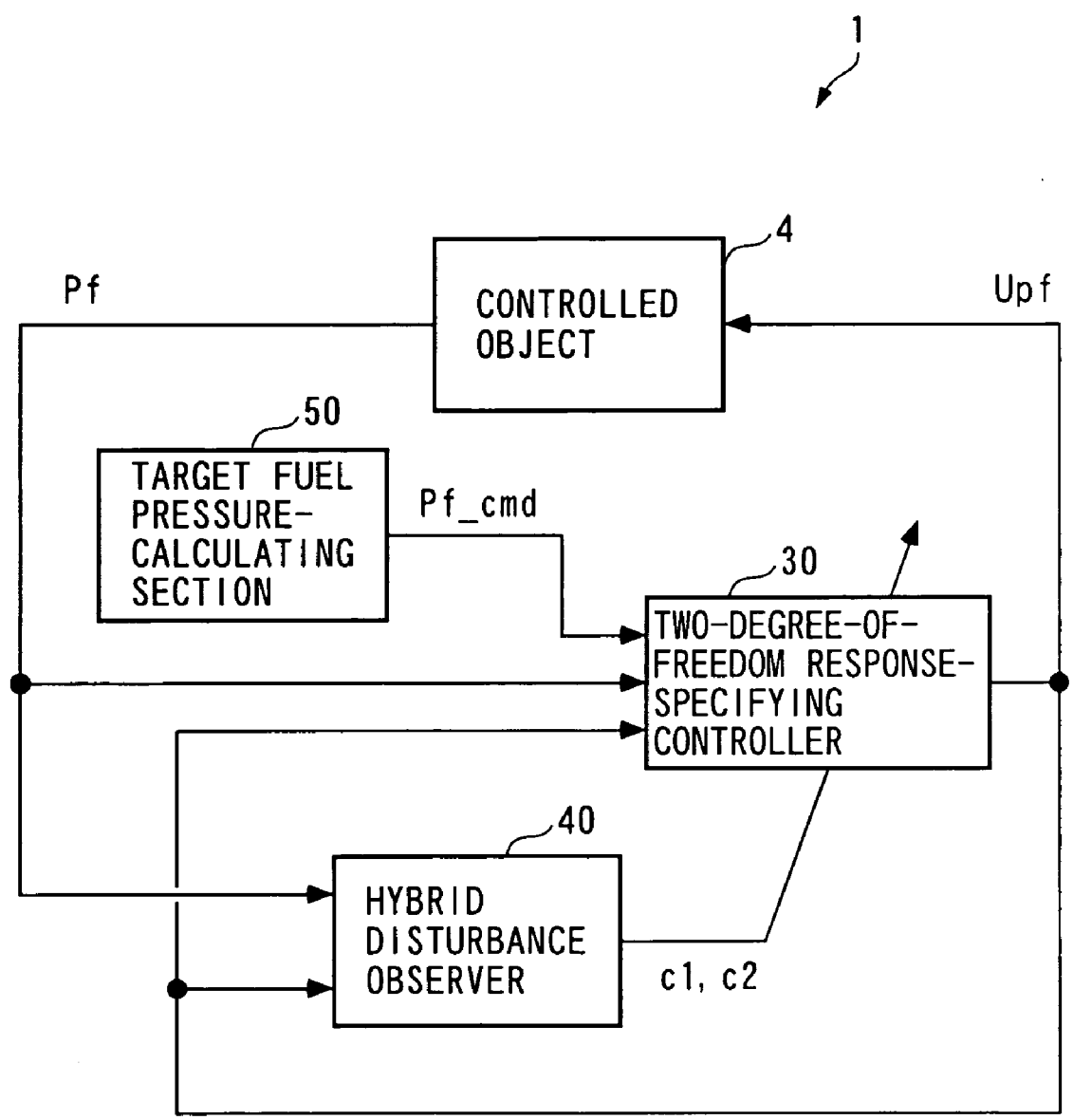
FIG. 3 is a schematic block diagram of the controller according to the first embodiment.

Next, the controller 1 according to the first embodiment will be described with reference to FIG. 3. As shown in FIG. 3, the controller 1 is configured to control the fuel pressure Pf as a control amount by inputting the fuel pressure control input UPf to a controlled object 4. The controlled object 4 corresponds to a system including the fuel supply system 10.

As shown in FIG. 3, the controller 1 is comprised of a two-degree-of-freedom response-specifying controller 30, a hybrid disturbance observer 40, and a target fuel pressure-calculating section 50, which are implemented by the ECU 2. In the present embodiment, the two-degree-of-freedom response-specifying controller 30 corresponds to the control input-calculating means, the hybrid disturbance observer 40 to the estimated control amount-calculating means, the first disturbance estimate-calculating means, and the second disturbance estimate-calculating means, and the target fuel pressure-calculating section 50 to the target control amount-setting means.

First, the target fuel pressure-calculating section 50 calculates a target fuel pressure Pf_cmd (target control amount) e.g. by map retrieval, described hereinafter. Then, the two-degree-of-freedom response-specifying controller 30 calculates the fuel pressure control input UPf based on the target fuel pressure Pf_cmd and the fuel pressure Pf, with a target value filter-type two-degree-of-freedom response-specifying control algorithm expressed by the following equations (1) to (6):

$$Pf\_cmd\_f(k) = -R \cdot Pf\_cmd\_f(k-1) + (1+R) \, Pf\_cmd(k) \qquad (1)$$

$$Upf(k) = Ueq(k) + Urch(k) \qquad (2)$$

$$Ueq(k) = \frac{1}{b1}\{(1-a1-S) \cdot Pf(k) + (S-a2) \cdot Pf(k-1) - b2 \cdot Upf(k-1) - c1(k) - c2(k) + Pf\_cmd\_f(k) + (S-1) \cdot Pf\_cmd\_f(k-1) - S \cdot Pf\_cmd\_f(k-2)\} \qquad (3)$$

$$Urch(k) = -\frac{Krch}{b1}\sigma(k) \qquad (4)$$

$$\sigma(k) = Epf(k) + S \cdot Epf(k-1) \qquad (5)$$

$$Epf(k) = Pf(k) - Pf\_cmd\_f(k-1) \qquad (6)$$

In these equations (1) to (6), each piece of discrete data with the symbol (k) is data sampled or calculated in timing synchronous with a predetermined control period (5 msec in the present embodiment), and the symbol k represents a position in the sequence of sampling or calculating cycles. For example, the symbol k indicates that a value therewith is a value sampled or calculated at the current control period, and the symbol k−1 indicates that a value therewith is a value sampled or calculated at the immediately preceding control period. This applies to discrete data in equations described hereinafter. It should be noted that in the following, the symbol k and the like are omitted when deemed appropriate.

In the present control algorithm, first, a filtered value Pf_cmd_f of the target fuel pressure is calculated with a first-order lag low-pass filter algorithm expressed by the equation (1). In the equation (1), the symbol R represents a target value filter-setting parameter. The target value filter-setting parameter is set to a value satisfying the relationship of −1<R<0.

Then, the fuel pressure control input UPf is calculated with a response-specifying control algorithm (a sliding mode control algorithm or a back stepping control algorithm) expressed by the equations (2) to (6). More specifically, as shown in the equation (2), the fuel pressure control input UPf is calculated as the sum of an equivalent control input Ueq and a reaching law input Urch. The equivalent control input Ueq is calculated using the equation (3). In the equation (3), symbols a1, a2, b1, and b2 represent model parameters of a controlled object model, referred to hereinafter. The model parameters are set to predetermined fixed values, respectively. Further, symbols c1 and c2 in the equation (3) represent the respective first and second disturbance estimates. The first and second disturbance estimates c1 and c2 are calculated by the hybrid disturbance observer 40 as described hereinafter. The symbol S in the equation (3) represents a switching function-setting parameter. The switching function-setting parameter S is set to a value satisfying the relationship of −1<R<S<0.

The reaching law input Urch is calculated using the equation (4). In the equation (4), the symbol Krch represents a predetermined reaching law gain, and the symbol σ represents a switching function. The symbol Epf in the equation (5) represents a follow-up error, which is defined by the equation (6).

The equations (1) to (6) are derived as follows: When the controlled object 4 is defined as a system to which the fuel pressure control input Upf is inputted as a control input, using the fuel pressure Pf as a control amount, and in which the first and second disturbance estimates c1 and c2 represent disturbance inputs, and this system is modeled into a discrete-time system model, the following equation (7) is obtained:

$$Pf(k+1) = a1 \cdot Pf(k) + a2 \cdot Pf(k-1) + b1 \cdot Upf(k) + b2 \cdot Upf(k-1) + c1 + c2 \qquad (7)$$

When a target value filter-type two-degree-of-freedom response-specifying control theory is used based on the controlled object model obtained by discretizing the first and second disturbance estimates c1 and c2 in the equation (7), such that the fuel pressure Pf converges to the target fuel pressure Pf_cmd, the equations (1) to (6) are derived.

Next, a description will be given of the hybrid disturbance observer 40. In the hybrid disturbance observer 40, the first disturbance estimate c1 and the second disturbance estimate c2 are calculated based on the fuel pressure Pf and the fuel pressure control input UPf, as follows:

First, an algorithm for calculating the first disturbance estimate c1 will be described. In this calculation algorithm, first, an estimate Pf_hat (estimated control value) of the fuel pressure Pf is calculated with an estimation algorithm expressed by the following equation (8). A method of deriving this estimation algorithm will be described in detail hereinafter.

$$Pf\_hat(k) = a1 \cdot Pf(k-1) + a2 \cdot Pf(k-2) + b1 \cdot Upf(k-1) + b2 \cdot Upf(k-2) + c2(k-1) \qquad (8)$$

Then, a first estimation error e_dov (first difference) is calculated using the following equation (9):

$$e\_dov(k) = Pf(k) - Pf\_hat(k) \qquad (9)$$

Then, the first disturbance estimate c1 is calculated based on the first estimation error e_dov, using the following equations (10) to (14):

$$c1(k) = -Q \cdot c1(k-1) + (1+Q) \cdot c1^*(k) \qquad (10)$$

$$c1(k) = c1^*(k-1) + c1^{**}(k) \qquad (11)$$

When $EPS < e\_dov(k) - e\_dov(k-1)$ $$c1^{**}(k) = EPS \qquad (12)$$

When $-EPS \leq e\_dov(k) - e\_dov(k-1) \leq EPS$ $$c1^{**}(k) = e\_dov(k) - e\_dov(k-1) \qquad (13)$$

When $-EPS > e\_dov(k) - e\_dov(k-1)$ $$c1^{**}(k) = -EPS \qquad (14)$$

As expressed by the equation (10), the first disturbance estimate c1 is calculated with a first-order lag low-pass filter algorithm. In the equation (10), the symbol Q represents a filter coefficient set to a value satisfying the relationship of $-1 < Q \leq 0$. The symbol c1* in the equation (10) represents a limited value of the first disturbance estimate c1. The limited value c1* is calculated with a rate limit algorithm expressed by the equations (11) to (14). The symbol c1** represents a value corresponding to the amount of change in the limited value c1*. The value c1** is calculated by subjecting the difference [e_dov(k)−e_dov(k−1)] between the current and immediately preceding values of the first estimation error to a limiting process with a value −ESP as a lower limit value and a value EPS as an upper limit value as expressed by the equations (12) to (14). It should be noted that the value EPS is set to a predetermined positive value.

The estimation algorithm expressed by the aforementioned equation (8) is derived as follows: When the controlled object is defined as a system to which the fuel pressure control input Upf is inputted as a control input, using the fuel pressure Pf as a control amount, and in which the second disturbance estimate c2 represents a disturbance input, the following equation (15) is obtained:

$$Pf(k+1)=a1 \cdot Pf(k)+a2 \cdot Pf(k-1)+b1 \cdot Upf(k)+b2 \cdot Upf(k-1)+c2 \quad (15)$$

When after shifting each variable of the equation (15) by an amount corresponding to one discrete time period 3, and discretizing the second disturbance estimate c2, the fuel pressure Pf for the fuel pressure Pf on the left side of the equation (15) is substituted by the estimate Pf_hat thereof, the aforementioned equation (8) is obtained.

Next, an algorithm for calculating the second disturbance estimate c2 will be described. In this calculation algorithm, the second disturbance estimate c2 is calculated with a fixed gain identification algorithm (disturbance estimation algorithm) expressed by the following equations (16) and (17):

$$c2(k) = \lambda \cdot c2(k-1) + \frac{Pdov}{1+Pdov} \cdot e\_dov\_H(k) \quad (16)$$

$$e\_dov\_H(k) = e\_dov(k) - c1(k) \quad (17)$$

In the equation (16), the symbol $\lambda$ represents a forgetting coefficient. The forgetting coefficient $\lambda$ is set to a value satisfying the relationship of $0<\lambda<1$. As expressed by the equation (16), the immediately preceding value c2(k−1) of the second disturbance estimate c2 is multiplied by the forgetting coefficient $\lambda$ smaller than a value of 1, whereby the second disturbance estimate c2 is calculated such that it progressively converges to a value of 0 as the computation proceeds. In short, a forgetting effect is imparted to the second disturbance estimate c2. It should be noted that when the forgetting effect provided by the forgetting coefficient $\lambda$ is not necessary, the forgetting coefficient $\lambda$ may be set to 1. Further, the symbol Pdov in the equation (16) represents a predetermined identification gain (fixed value), and the symbol e_dov_H represents a second estimation error (second difference) calculated using the equation (17).

As described above, the hybrid disturbance observer 40 calculates the first disturbance estimate c1 with the algorithm as a combination of the rate limit algorithm and the low-pass filter algorithm, so that the first disturbance estimate c1 is provided with a predetermined delay characteristic (response delay). For this reason, when the controlled object 4 is in a steady state in which disturbance or a change in the target fuel pressure Pf_cmd is small and the modeling error relatively small, it is possible to compensate for the modeling error by the first disturbance estimate c1 alone, whereas in a transient state in which the modeling error temporarily assumes an excessively large value due to excessively large disturbance or a sudden change in the target fuel pressure Pf_cmd, it is impossible to quickly compensate for the modeling error by the first disturbance estimate c1 alone.

However, the second disturbance estimate c2 is calculated based on the second estimation error e_dov_H as the difference between the first estimation error e_dov and the first disturbance estimate c1, with the fixed gain identification algorithm. This makes it possible, even in the above-mentioned transient state in which the modeling error temporarily assumes an excessively large value, to quickly compensate for a portion of the modeling error, which cannot be compensated for by the first disturbance estimate c1 alone, by the second disturbance estimate c2.

Further, when the forgetting coefficient $\lambda$ is not used in the identification algorithm for calculating the second disturbance estimate c2, i.e. when the forgetting coefficient $\lambda$ is set to 1, if the computation of the forgetting coefficient $\lambda$ is continued from the transient state in which the modeling error temporarily assumes an excessively large value to the steady state where the modeling error is reduced to a relatively small value, the second disturbance estimate c2 not only exhibits an oscillatory repetitive behavior, but also mutual interaction between the first disturbance estimate c1 and the second disturbance estimate c2 occurs due to an integral structure contained in the identification algorithm, and as a consequence, the fuel pressure Pf can exhibit an oscillatory swing-back behavior with respect to the target fuel pressure Pf_cmd. In the present embodiment, however, since the immediately preceding value c2(k−1) of the second disturbance estimate c2 is multiplied by the forgetting coefficient $\lambda$, the forgetting effect provided by the forgetting coefficient $\lambda$ causes the second disturbance estimate c2 to progressively converge to a value of 0 as the computation proceeds. This makes it possible to compensate for the portion of the modeling error, which cannot be compensated for by the first disturbance estimate c1 alone, by the second disturbance estimate c2 in the transient state in which the modeling error temporarily assumes an excessively large value, as well as to appropriately compensate for the modeling error by the first disturbance estimate c1 alone in the steady state where the modeling error is reduced to a relatively small value after the progress of computation. In short, it is possible to appropriately compensate for the modeling error due to disturbance or a change in the target fuel pressure Pf_cmd while avoiding interaction between the two disturbance estimates c1 and c2, thereby enhancing stability of the control system.

Figure 4:
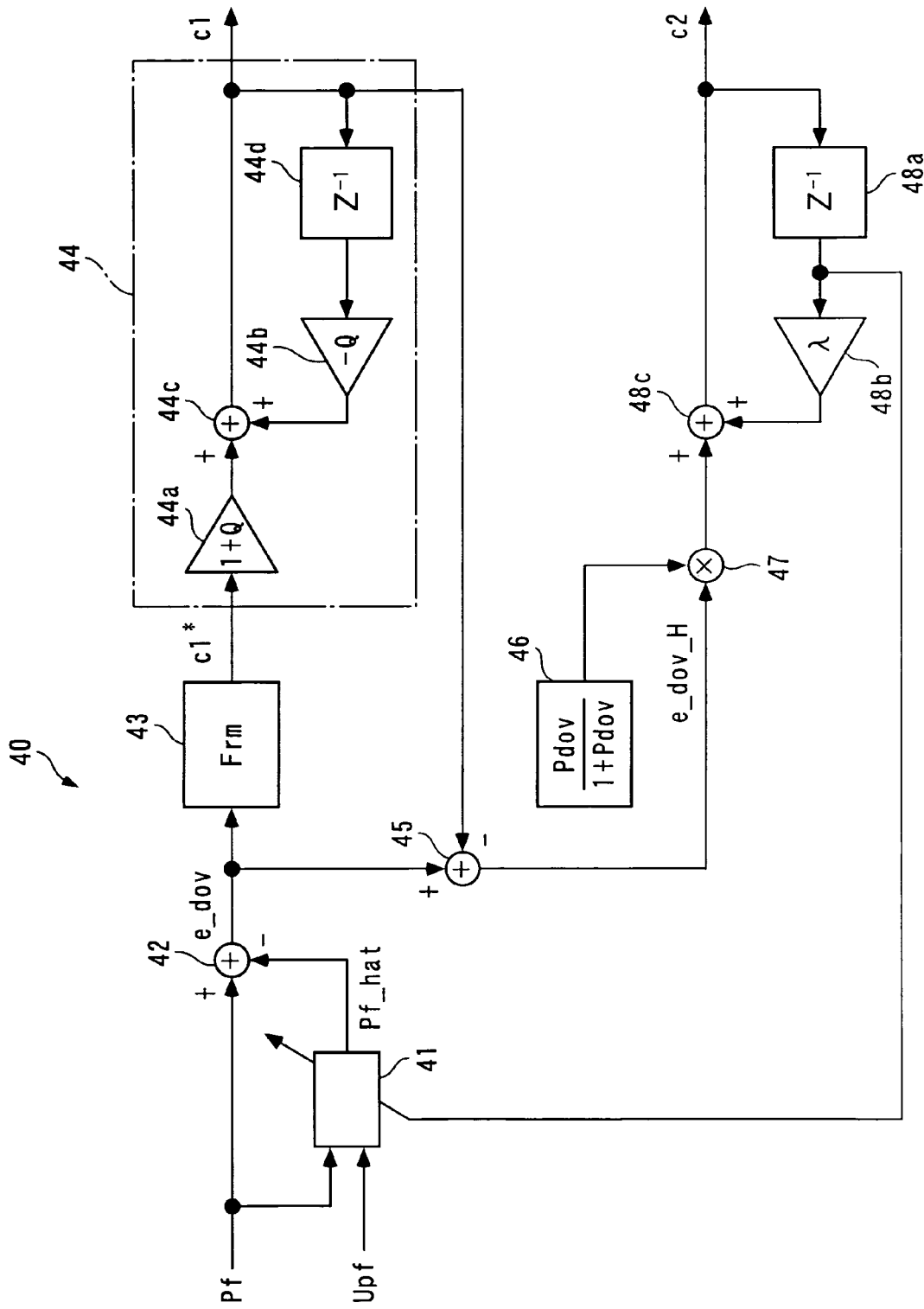
FIG. 4 is a schematic block diagram of a hybrid disturbance observer of the first embodiment.

FIG. 4 is a block diagram showing the configuration of the hybrid disturbance observer 40. As shown in FIG. 4, in the hybrid disturbance observer 40, an estimator 41 calculates the estimate Pf_hat of the fuel pressure Pf with the estimation algorithm expressed by the equation (8), and a subtractor calculates the first estimation error e_dov.

Then, a rate limiter 43 calculates the limited value c1* based on the first estimation error e_dov, with the algorithm expressed by the aforementioned equations (11) to (14). Further, the low-pass filter 44 calculates the first disturbance estimate c1 with the algorithm expressed by the equation (10). The low-pass filter 44 is comprised of amplifiers 44a and 44b, an adder 44c, and a delay element 44d. It should be noted that the rate limiter 43 and the low-pass filter 44 may be replaced by a nonlinear low-pass filter that calculates the first disturbance estimate c1 based on the first estimation error e_dov, with the algorithm expressed by the equations (10) to (14).

On the other hand, a subtractor 45 calculates the second estimation error e_dov_H, and a gain coefficient value-calculating section 46 calculates a gain coefficient value Pdov/(1+Pdov), whereafter a multiplier 47 multiplies these two values by each other. An amplifier 48b multiplies the second disturbance estimate c2 delayed by a delay element 48a by the forgetting coefficient $\lambda$, and then an adder 48c adds together a product e_dov_H·Pdov/(1+Pdov) and a product $\lambda \cdot c2$ to thereby calculate the second disturbance estimate c2.

Figure 5:
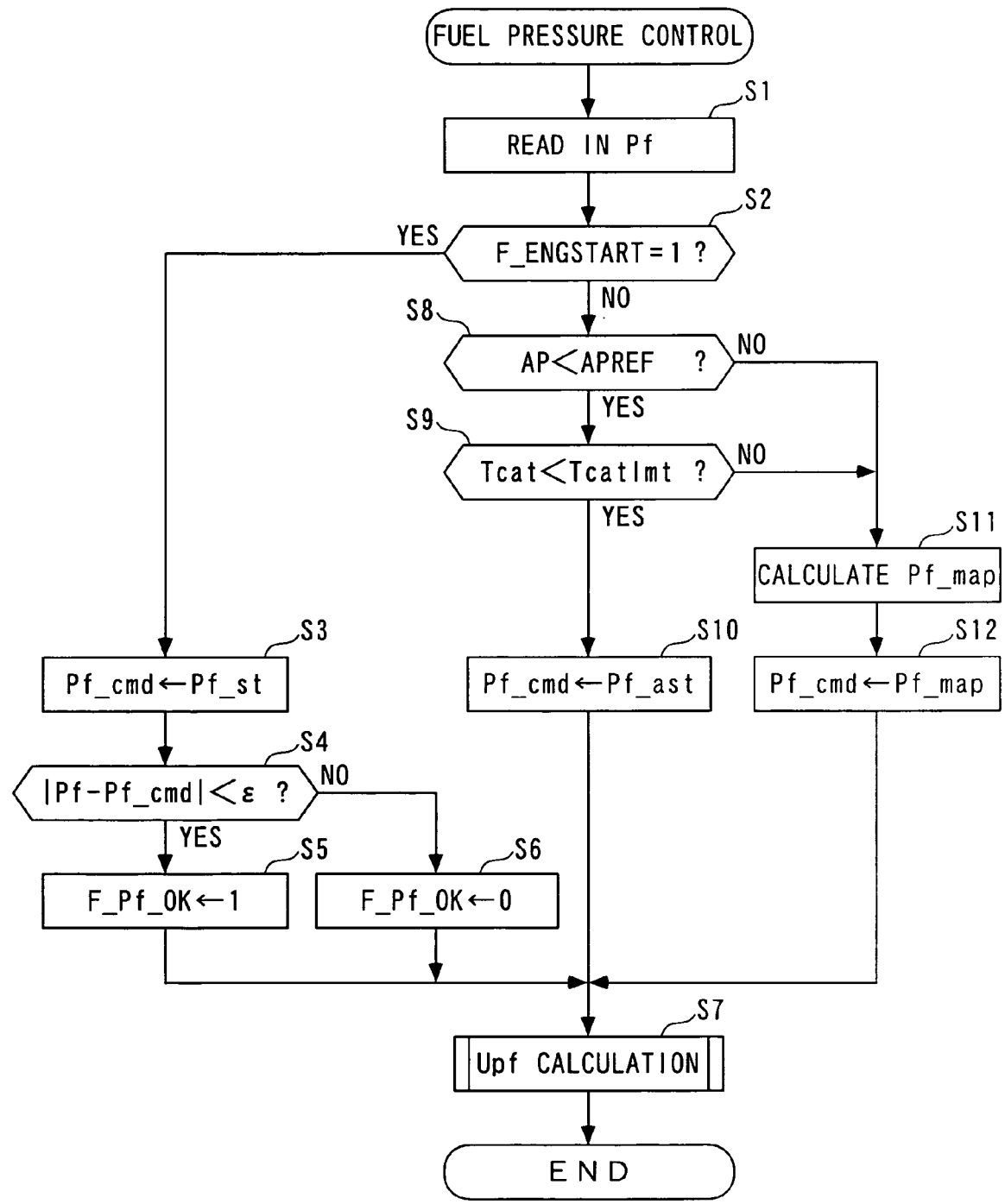
FIG. 5 is a flowchart showing a fuel pressure control process.

Next, the fuel pressure control process, which is executed by the ECU 2, will be described with reference to FIG. 5. The fuel pressure control process is carried out in a predetermined cycle (5 msec in the present embodiment) so as to calculate the fuel pressure control input Upf.

First, in a step 1, a value of the fuel pressure Pf stored in the RAM is read in. In other words, the value of the fuel pressure Pf is sampled. It should be noted that the value of the fuel pressure Pf is calculated by the moving average method, based on detection signal values from the fuel pressure sensor 20 in a fuel injection control process, not shown.

Then, the process proceeds to a step 2, wherein it is determined whether or not an engine start flag F_ENGSTART is equal to 1. The engine start flag F_ENGSTART is set by determining in a determination process, not shown, from the engine speed NE and the output signal of the IG·SW 23 whether or not engine start control, i.e. cranking of the engine is being executed. More specifically, when the engine start control is being executed, the engine start flag F_ENGSTART is set to 1, and otherwise set to 0.

If the answer to the question of the step 2 is affirmative (YES), i.e. if the engine start control is being executed, the program proceeds to a step 3, wherein the target fuel pressure Pf_cmd is set to a predetermined start-time value Pf_st. The predetermined start-time value Pf_st is set to a value (e.g. 2 MPa) that can ensure reduction of engine starting time and fuel spray suitable for engine start in a well balanced manner.

Then, the process proceeds to a step 4, wherein it is determined whether or not the absolute value |Pf—Pf_cmd| of the difference between the fuel pressure and the target fuel pressure is smaller than a predetermined determination value ε. If the answer to the question is affirmative (YES), a fuel pressure maintaining flag F_Pf_OK is set to 1 in a step 5 so as to indicate that the fuel pressure Pf is maintained high enough to perform appropriate fuel injection.

On the other hand, if the answer to the question of the step 4 is negative (NO), the fuel pressure maintaining flag F_Pf_OK is set to 0 in a step 6. It should be noted that if F_Pf_OK=0 holds, fuel injection by the fuel injection valves 9 and ignition by the ignition plugs are stopped in the fuel injection control process and an ignition timing control process, not shown, respectively.

In a step 7 following the step 5 or 6, the fuel pressure control input Upf is calculated with the algorithms expressed by the aforementioned equations (1) to (6), (8) to (14), (16), and (17), followed by terminating the present process.

On the other hand, if the answer to the question of the step 2 is negative (NO), i.e. if the engine start control is not being executed, the process proceeds to a step 8, wherein it is determined whether or not the accelerator pedal opening AP is smaller than a predetermined value APREF. The predetermined value APREF is used for determining whether the accelerator pedal is not being stepped on. The predetermined value APREF is set to a value (e.g. 1°) with reference to which it can be determined whether the accelerator pedal is not being stepped on.

If the answer to the question of the step 8 is affirmative (YES), i.e. if the accelerator pedal is not being stepped on, the process proceeds to a step 9, wherein it is determined whether or not the count Tcat of a catalyst warm-up timer is smaller than a predetermined value Tcatlmt (e.g. 30 seconds). This catalyst warm-up timer, which is used to count an execution time period of a catalyst warm-up control process, is formed by a upcount timer. The catalyst warm-up control process is executed so as to quickly activate a catalyst, not shown, in a catalyst device, not shown, provided in an exhaust pipe, not shown, of the engine 3.

If the answer to the question of the step 9 is affirmative (YES), it is judged that the catalyst warm-up control is to be executed, and the process proceeds to a step 10, wherein the target fuel pressure Pf_cmd is set to a predetermined catalyst warm-up control value Pf_ast. This predetermined catalyst warm-up control value Pf_ast is preset to a value (e.g. 20 MPa) of the fuel pressure Pf that can maintain a stable combustion state during execution of ignition timing retard control in the catalyst warm-up control.

Then, the fuel pressure control input Upf is calculated in the step 7, followed by terminating the present process.

Figure 6:
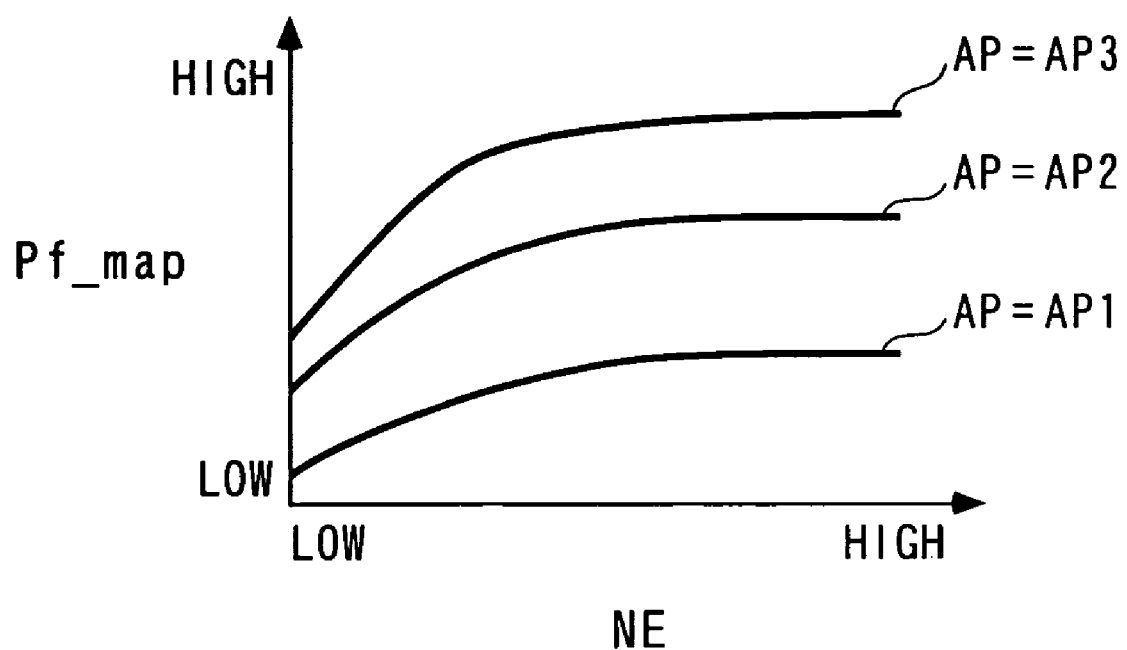
FIG. 6 is a diagram showing an example of a map for use in the calculation of a normal operation value.

On the other hand, if the answer to the question of the step 8 or 9 is negative (NO), i.e. if the accelerator pedal is being stepped on or Tcat≧Tcatlmt holds when the engine start control is not being executed, the process proceeds to a step 11, wherein a normal operation value Pf_map is calculated by searching a map shown in FIG. 6 according to the engine speed NE and the accelerator pedal opening AP. In FIG. 6, reference symbols AP1 to AP3 represent predetermined values of the accelerator pedal opening AP in the relationship of AP1<AP2<AP3.

In this map, the normal operation value Pf_map is set to a larger value as the engine speed NE is higher or the accelerator pedal opening AP is larger. This is because as the engine speed NE is higher or the accelerator pedal opening AP is larger, the output demanded of the engine 3 is larger, and therefore a higher fuel pressure Pf is demanded.

In a step 12 following the step 11, the target fuel pressure Pf_cmd is set to the normal operation value Pf_map. Then, the fuel pressure control input Upf is calculated in the step 7, followed by terminating the present process.

Figure 7:
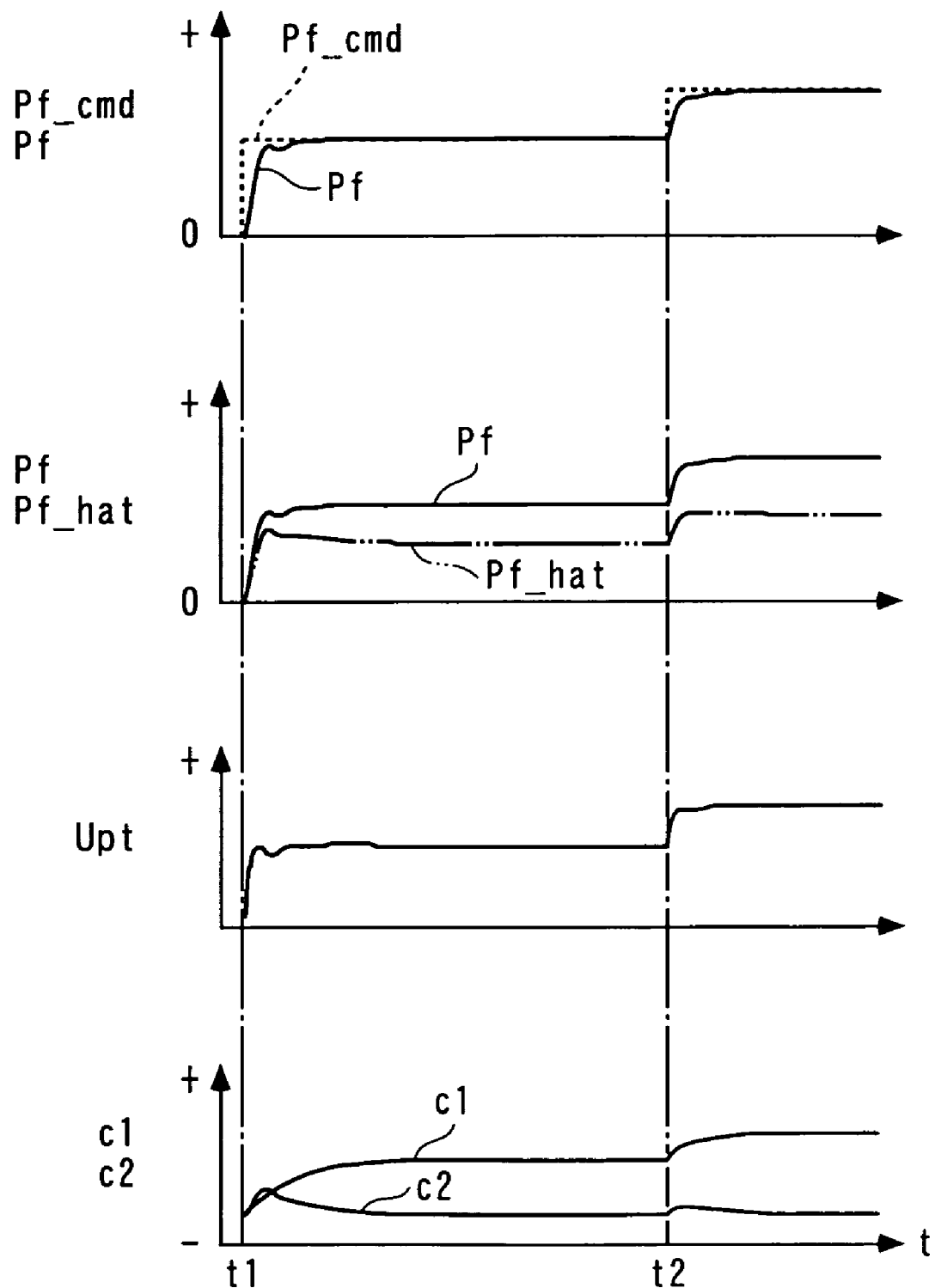
FIG. 7 is a timing diagram showing an example of a result of fuel pressure control by the controller according to the first embodiment.
Figure 8:
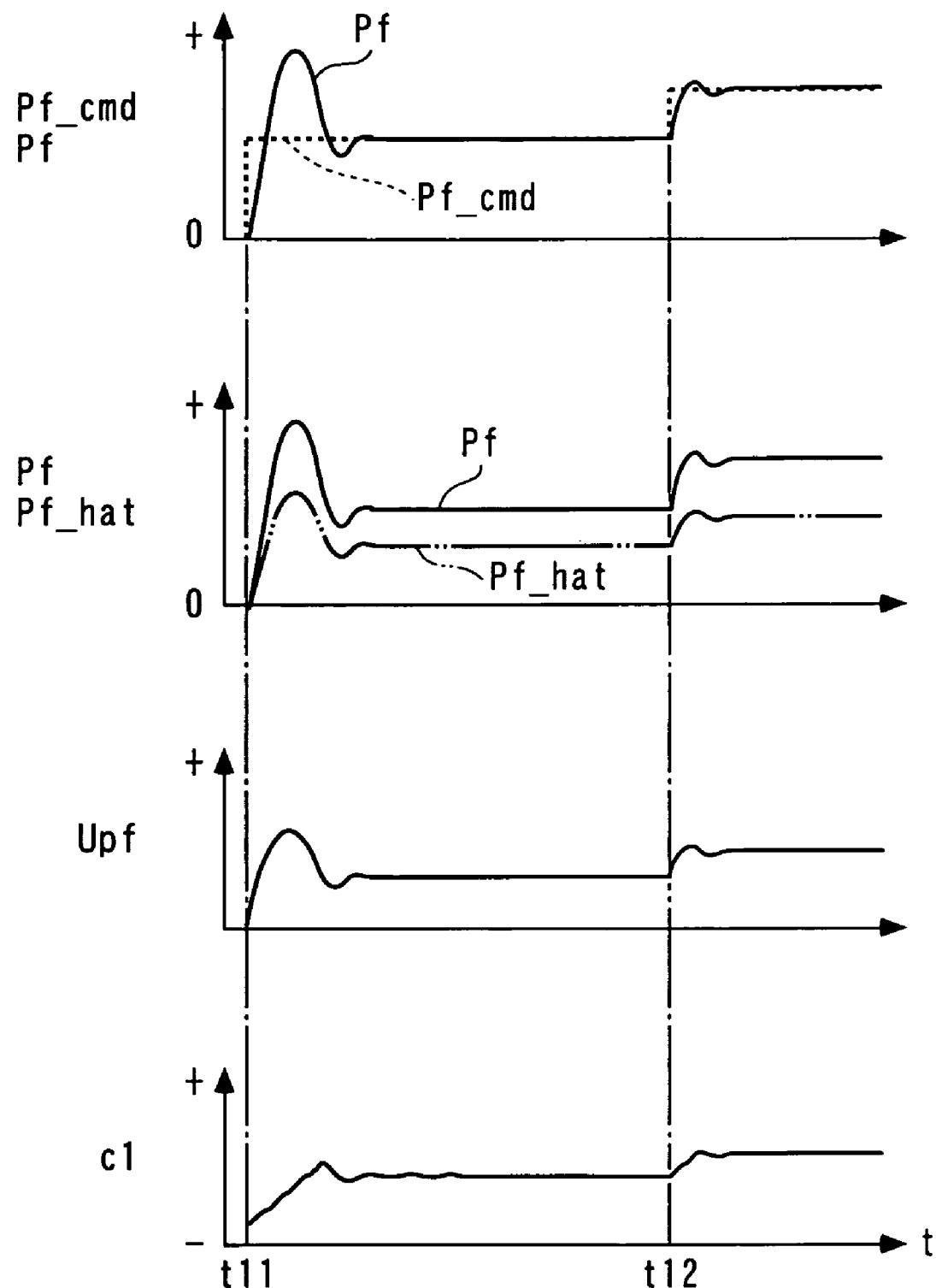
FIG. 8 is a timing diagram showing a result of fuel pressure control by a comparative example.

Next, a description will be given of the result of simulation of fuel pressure control (hereinafter referred to "the control result") by the controller 1 of the present embodiment configured as above. Referring first to FIG. 7, there is shown the control result in the present embodiment. Further, FIG. 8 shows a control result of a comparative example in which a general disturbance observer is used in place of the hybrid disturbance observer 40 of the present embodiment. More specifically, the control result of the comparative example corresponds to a result obtained in the case where the disturbance observer calculates only the first disturbance estimate c1 using an equation obtained by substituting c1 for c2 in the equation (8), and the equations (9) to (14), and the two-degree-of-freedom response-specifying controller calculates the fuel pressure control input Upf using an equation obtained by omitting c2 from the equation (3), and the equations (1), (2), and (4) to (6).

First of all, as is apparent from FIG. 8, in the control result of the comparative example, when a relatively large change occurs in the target fuel pressure Pf_cmd (time t11 and time t12), the fuel pressure Pf overshoots the target fuel pressure Pf_cmd, which temporarily causes a sharp increase in the degree of discrepancy therebetween, i.e. the difference between the two values, as well as an oscillatory swing-back behavior of the fuel pressure Pf which lasts until the fuel pressure Pf converges to the target fuel pressure Pf_cmd. That is, it can be seen from the result that the stability of the control system is low.

In contrast, the control result of the present embodiment shows that even when a relatively large change occurs in the target fuel pressure Pf_cmd (time t1 and time t2), the degree of discrepancy between the fuel pressure Pf and the target fuel pressure Pf_cmd is held small without the fuel pressure Pf overshooting the target fuel pressure Pf_cmd, and the fuel pressure Pf converges to the target fuel pressure Pf_cmd without almost any oscillatory swing-back behavior. That is, it can be seen from the result that the stability of the control system is high.

As described above, according to the controller 1 of the present embodiment, the first disturbance estimate c1 and the second disturbance estimate c2 are calculated by the hybrid disturbance observer 40, and the fuel pressure control input Upf is calculated using the disturbance estimates c1 and c2. In this case, the first disturbance estimate c1 is calculated as a value having the predetermined delay characteristic with the algorithm as the combination of the rate limit algorithm and the low-pass filter algorithm, and hence in the steady state where the modeling error due to disturbance or a change in the target fuel pressure Pf_cmd is relatively small, it is possible to compensate for the modeling error by the first disturbance estimate c1. This enables the fuel pressure Pf to converge to the target fuel pressure Pf_cmd while suppressing occurrence of its oscillatory swing-back behavior.

Further, the second disturbance estimate c2 is calculated based on the second estimation error e_dov_H as the difference between the first estimation error e_dov and the first disturbance estimate c1, with the fixed gain identification algorithm, so that even in the transient state in which the modeling error temporarily assumes an excessively large value, a portion of the modeling error, which cannot be compensated for by the first disturbance estimate c1 alone, can be quickly compensated for by the second disturbance estimate c2. This enables the fuel pressure Pf to quickly converge to the target fuel pressure Pf_cmd while suppressing occurrence of its overshoot and oscillatory swing-back behavior. Thus, not only in the steady state, but also in the transient state, the stability of the fuel pressure control system can be enhanced.

Furthermore, since the immediately preceding value c2 (k−1) of the second disturbance estimate c2 is multiplied by the forgetting coefficient λ, owing to the forgetting effect provided by the forgetting coefficient λ, the second disturbance estimate c2 is calculated such that it progressively converges to a value of 0 as the computation proceeds. This makes it possible to compensate for the portion of the modeling error, which cannot be compensated for by the first disturbance estimate c1 alone, by the second disturbance estimate c2 in the state in which the modeling error temporarily assumes an excessively large value, as well as to appropriately compensate for the modeling error by the first disturbance estimate c1 alone in the steady state where the modeling error is reduced to a relatively small value with the lapse of time. In short, it is possible to avoid interaction between the two disturbance estimates c1 and c2, thereby further enhancing the stability of the fuel pressure control system.

Next, a controller 1A according to a second embodiment of the present invention will be described with reference to FIG. 9. Similarly to the controller 1 of the above described first embodiment, the controller 1A is configured to control the fuel pressure Pf. The controller 1A is distinguished from the controller 1 of the first embodiment only by its control algorithm.

Figure 9:
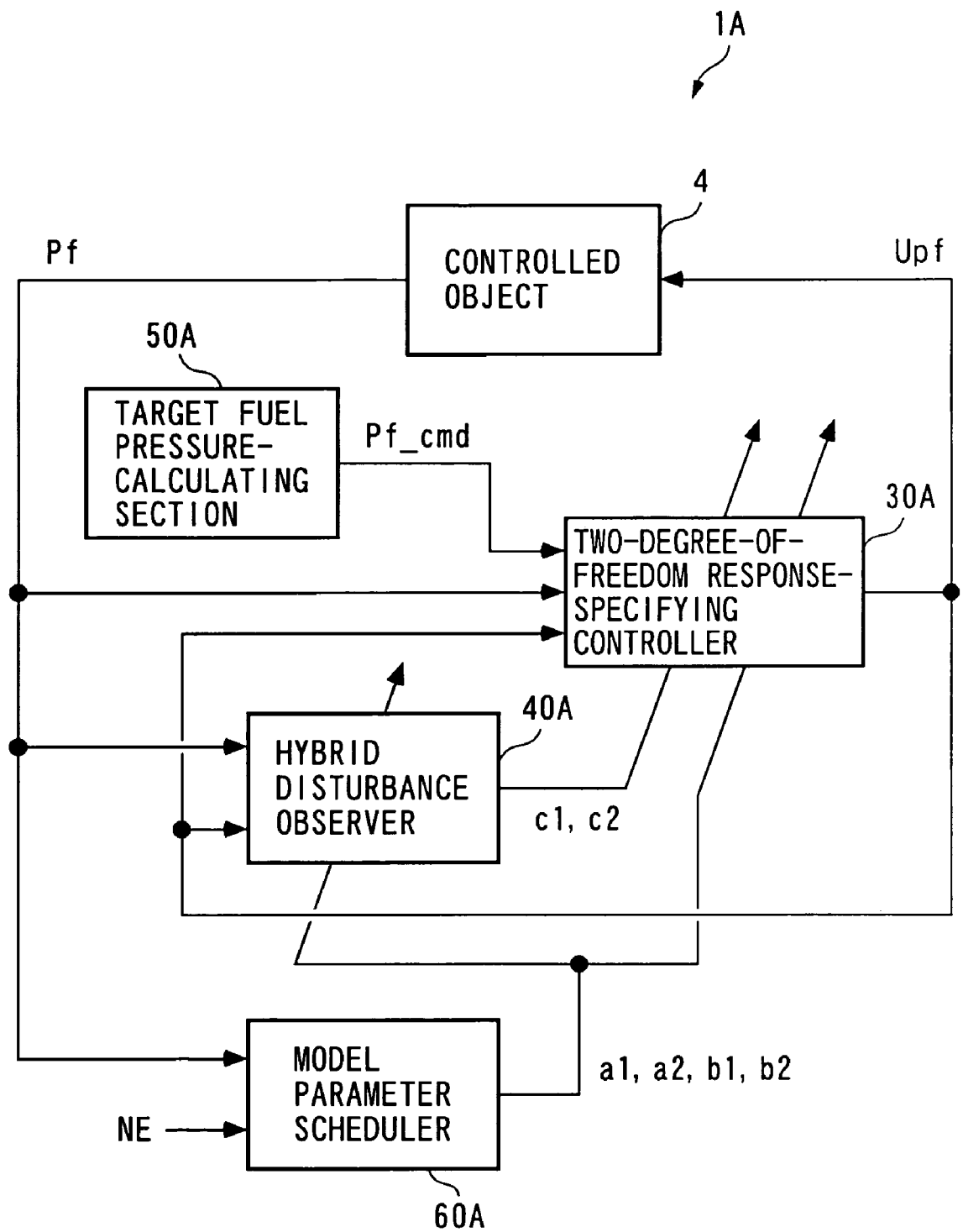
FIG. 9 is a schematic block diagram of a controller according to a second embodiment of the present invention.

As shown in FIG. 9, the controller 1A is comprised of a two-degree-of-freedom response-specifying controller 30A, a hybrid disturbance observer 40A, a target fuel pressure-calculating section 50A, and a model parameter scheduler 60A, which are implemented by the ECU 2. In the present embodiment, the two-degree-of-freedom response-specifying controller 30A corresponds to the control input-calculating means, the hybrid disturbance observer 40A to the estimated control amount-calculating means, the first disturbance estimate-calculating means, and the second disturbance estimate-calculating means, the target fuel pressure-calculating section 50A to the target control amount-setting means, and the model parameter scheduler 60A to the model parameter-setting means.

First, the target fuel pressure-calculating section 50A calculates the target fuel pressure Pf_cmd in the same manner as by the target fuel pressure-calculating section 50. Then, the model parameter scheduler 60A calculates the model parameters a1, a2, b1, and b2 using the following equations (18) to (21), respectively:

$$a1(k) = a1\_base(k) \tag{18}$$

$$a2(k) = a2\_base(k) \tag{19}$$

$$b1(k) = b1\_base(k) \cdot Kne(k) \tag{20}$$

$$b2(k) = b2\_base(k) \cdot Kne(k) \tag{21}$$

Figure 10:
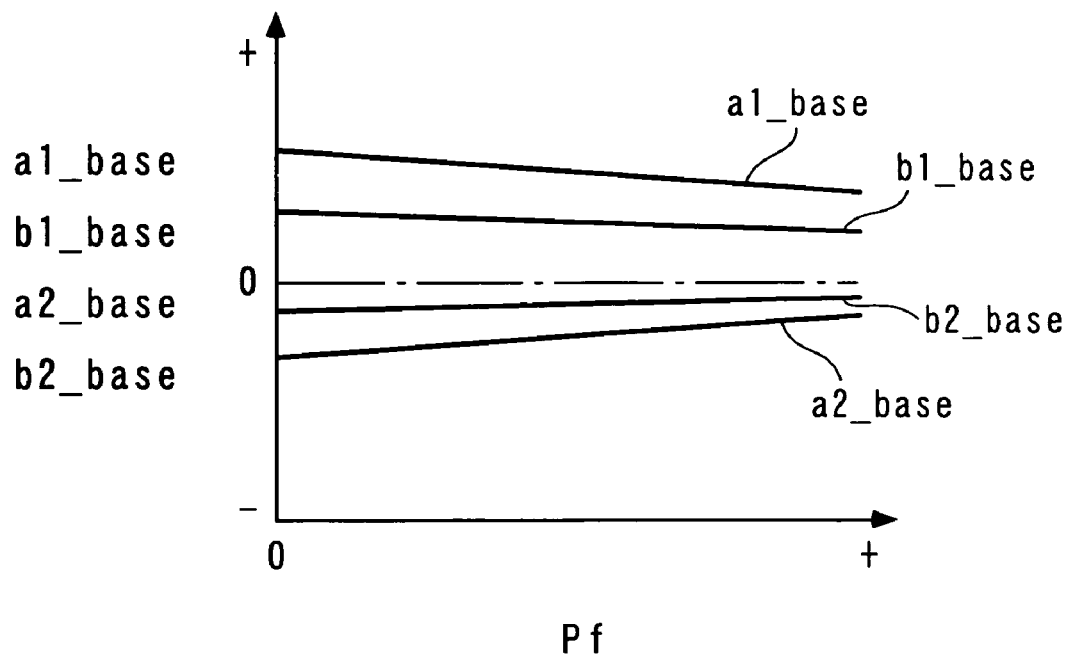
FIG. 10 is a diagram showing an example of a table for use in the calculation of retrieved values of model parameters by a model parameter scheduler of the second embodiment.

Symbols a1_base, a2_base, b1_base, and b2_base in the above equations (18) to (21) represent retrieved values of the model parameters a1, a2, b1, and b2, respectively. These retrieved values are specifically calculated by searching a table shown in FIG. 10, according to the fuel pressure Pf. As shown in FIG. 10, each of the retrieved values a1_base and a2_base is set such that its absolute value becomes smaller as the fuel pressure Pf is higher. This is because the efficiency of the high-pressure pump 17 is reduced with increase in the fuel pressure Pf, which makes the fuel pressure Pf more stable, and hence the absolute values of the model parameters a1 and a2 are set to smaller values, respectively, in accordance with increase in the fuel pressure Pf. Similarly, each of the retrieved values b1_base and b2_base is set such that its absolute value becomes smaller as the fuel pressure Pf is higher. This is because the change gain of the fuel pressure Pf with respect to the fuel pressure control input Upf is reduced with increase in the fuel pressure Pf, and hence the absolute values of the model parameters b1 and b2 are set to smaller values, respectively, in accordance with increase in the fuel pressure Pf.

Figure 11:
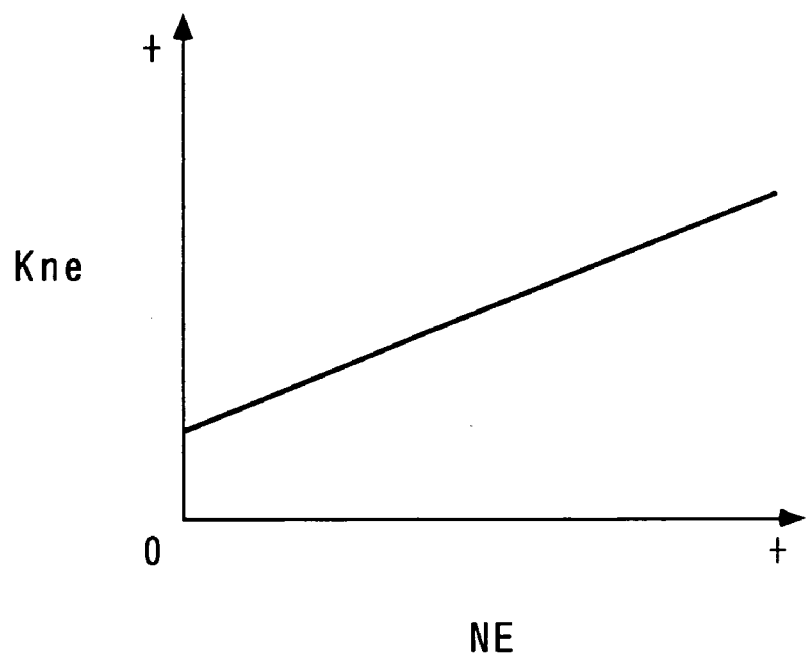
FIG. 11 is a diagram showing an example of a table for use in the calculation of a correction coefficient by the model parameter scheduler of the second embodiment.

Further, in the equations (20) and (21), the symbol Kne represents a correction coefficient. More specifically, the correction coefficient Kne is calculated by searching a table shown in FIG. 11 according to the engine speed NE. As shown in FIG. 11, the correction coefficient Kne is set to a lager value as the engine speed NE is higher. This is because as the engine speed NE is higher, the amount of fuel discharged from the high-pressure pump 17 per unit time increases, which increases the change gain of the fuel pressure Pf with respect to the fuel pressure control input Upf, so that it is required to set the absolute values of the model parameters b1 and b2 to larger values in accordance with increase in the fuel discharge amount. In the present embodiment, the fuel pressure Pf and the engine speed NE correspond to parameters indicative of the state of the controlled object.

In the two-degree-of-freedom response-specifying controller 30A, the fuel pressure control input Upf is calculated using a target value filter-type two-degree-of-freedom response-specifying algorithm expressed by the following equations (22) to (27):

$$Pf\_cmd\_f(k) = -R \cdot Pf\_cmd\_f(k-1) + (1+R) \cdot Pf\_cmd(k) \tag{22}$$

$$Upf(k) = Ueq(k) + Urch(k) \tag{23}$$

-continued $$Ueq(k) = \frac{1}{b1(k)}\{(1 - a1(k) - S) \cdot Pf(k) + (S - a2(k)) \cdot \quad (24)$$
$$Pf(k - 1) - b2(k) \cdot Upf(k - 1) - c1(k) - b1(k) \cdot$$
$$c2(k) + Pf\_cmd\_f(k) + (S - 1) \cdot Pf\_cmd\_f(k - 1) -$$
$$S \cdot Pf\_cmd\_f(k - 2)\}$$
$$= \frac{1}{b1(k)}\{(1 - a1(k) - S) \cdot Pf(k) + (S - a2(k)) \cdot$$
$$Pf(k - 1) - b2(k) \cdot Upf(k - 1) - c1(k) +$$
$$Pf\_cmd\_f(k) + (S - 1) \cdot Pf\_cmd\_f(k - 1) -$$
$$S \cdot Pf\_cmd\_f(k - 2)\} - c2(k)$$

$$Urch(k) = -\frac{Krch}{b1}\sigma(k) \quad (25)$$

$$\sigma(k) = Epf(k) + S \cdot Epf(k - 1) \quad (26)$$

$$Epf(k) = Pf(k) - Pf\_cmd\_f(k - 1) \quad (27)$$

The control algorithm expressed by the equations (22) to (27) is different from that expressed by the equations (1) to (6) used by the two-degree-of-freedom response-specifying controller 30, in that the second disturbance estimate c2 on the right side of the equation (24) for calculating the equivalent control input Ueq is not multiplied by 1/b1. The reason for this is as follows: If the equation (3) for calculating the equivalent control input Ueq is employed, since the second disturbance estimate c2 is multiplied by 1/b1, the value of the model parameter b1 directly influences the effect of compensating for the modeling error by the second disturbance estimate c2. As a consequence, if the model parameter b1 sharply changes with a sudden change in the fuel pressure Pf or the engine speed NE, the value c2/b1 in the equation (3) for calculating the equivalent control input Ueq can also change sharply, which causes discrepancy of the fuel pressure Pf from the target fuel pressure Pf_cmd, resulting in an increase in the difference between the two.

To avoid this, it is only required to configure the equation for calculating the equivalent control input Ueq such that the second disturbance estimate c2 on the right side thereof is not multiplied by 1/b1. Therefore, in the present embodiment, the control algorithm expressed by the equations (22) to (27) is derived by using an imaginary controlled object model represented by the following equation (28), and applying the target value filter-type two-degree-of-freedom response-specifying algorithm to the imaginary controlled object model such that the fuel pressure Pf converges to the target fuel pressure Pf_cmd.

$$Pf(k+1) = a1 \cdot Pf(k) + a2 \cdot Pf(k-1) + b1 \cdot Upf(k) + b2 \cdot Upf(k-1) + c1 + b1 \cdot c2 \quad (28)$$

On the other hand, in the hybrid disturbance observer 40A, the first disturbance estimate c1 and the second disturbance estimate c2 are calculated based on the fuel pressure Pf and the fuel pressure control input Upf, respectively, as follows: First, the first disturbance estimate c1 is calculated with an algorithm as a combination of the estimation algorithm, the rate limit algorithm, and the low-pass filter algorithm as expressed by the following equations (29) to (35):

$$Pf\_hat(k) = a1(k) \cdot Pf(k-1) + a2(k) \cdot Pf(k-2) + b1(k) \cdot \quad (29)$$
$$Upf(k-1) + b2(k) \cdot Upf(k-2) +$$
$$b1(k) \cdot c2(k-1)$$

$$e\_dov(k) = Pf(k) - Pf\_hat(k) \quad (30)$$

$$c1(k) = -Q \cdot c1(k-1) + (1+Q) \cdot c1^*(k) \quad (31)$$

$$c1^*(k) = c1^*(k-1) + c1^{**}(k) \quad (32)$$

· When $EPS < e\_dov(k) - e\_dov(k-1) c1^{**}(k) = EPS$ (33)

· When $-EPS \leq e\_dov(k) - e\_dov(k-1) \leq EPS$ (34)
$c1^{**}(k) = e\_dov(k) - e\_dov(k-1)$ · When $-EPS > e\_dov(k) - e\_dov(k-1)$ (35)
$c1^{}(k) = -EPS$ The control algorithm expressed by the equations (29) to (35) is different from that expressed by the equations (8) to (14) used by the hybrid disturbance observer 40, in that the second disturbance estimate c2 on the right side of the equation (29) for calculating the estimate Pf_hat of the fuel pressure Pf is multiplied by the model parameter b1. This is because the estimation algorithm expressed by the equation (29) is derived based on the controlled object in which the first disturbance estimate c1** is omitted from the right side of the equation (28).

Further, the second disturbance estimate c2 is calculated with a variable-gain sequential identification algorithm (disturbance estimation algorithm) expressed by the following equations (36) and (37):

$$c2(k) = \lambda \cdot c2(k-1) + \frac{b1(k) \cdot Pdov}{1 + b1(k) \cdot Pdov \cdot b1(k)} e\_dov\_H(k) \quad (36)$$

$$e\_dov\_H(k) = e\_dov(k) - c1(k) \quad (37)$$

According to the controller 1A of the second embodiment configured as above, the two disturbance estimates c1 and c2 are calculated by the hybrid disturbance observer 40A, and the fuel pressure control input Upf is calculated using the disturbance estimates c1 and c2, so that it is possible to obtain the same advantageous effects as provided by the controller 1.

More specifically, in the steady state where the modeling error is relatively small, the modeling error can be compensated for by the first disturbance estimate c1, while in the transient state in which the modeling error temporarily assumes an excessively large value due to an excessively large disturbance or a sudden change in the target fuel pressure Pf_cmd, a portion of the modeling error, which cannot be compensated for by the first disturbance estimate c1 alone, can be quickly compensated for by the second disturbance estimate c2. Further, since the immediately preceding value c2(k−1) of the second disturbance estimate c2 is multiplied by the forgetting coefficient λ in the algorithm for calculating the second disturbance estimate c2, it is possible to avoid interaction between the two disturbance estimates c1 and c2.

Additionally, in the controller 1A of the present embodiment, since the model parameter scheduler 60A calculates the model parameters a1 and a2 according to the fuel pressure Pf, and the model parameters b1 and b2 according to the fuel pressure Pf and the engine speed NE, it is possible to calculate the two disturbance estimates c1 and c2 while causing a change in the dynamic characteristic of the controlled object 4 due to changes in the fuel pressure Pf and the engine speed NE, i.e. a change in the dynamic characteristic between the fuel pressure Pf and the fuel pressure control input Upf, to be quickly reflected in the calculation, and compensate for the modeling error by the disturbance estimates c1 and c2. In particular, since the equation (24) for calculating the equivalent control input Ueq is configured such that the second disturbance estimate c2 on the right side thereof is not multiplied by 1/b1, the effect of compensating for the modeling error by the second disturbance estimate c2 can be reliably secured. With this configuration of the controller 1A of the present embodiment, the stability and control accuracy of the fuel pressure control system can be further enhanced compared with the controller 1 of the first embodiment which uses the predetermined fixed values for the respective parameters a1, a2, b1, and b2.

Next, a controller 1B according to a third embodiment of the present invention will be described with reference to FIG. 12. Similarly to the above described controllers 1 and 1A, the controller 1B controls the fuel pressure Pf. The controller 1B is distinguished from the controllers 1 and 1A only by its control algorithm.

Figure 12:
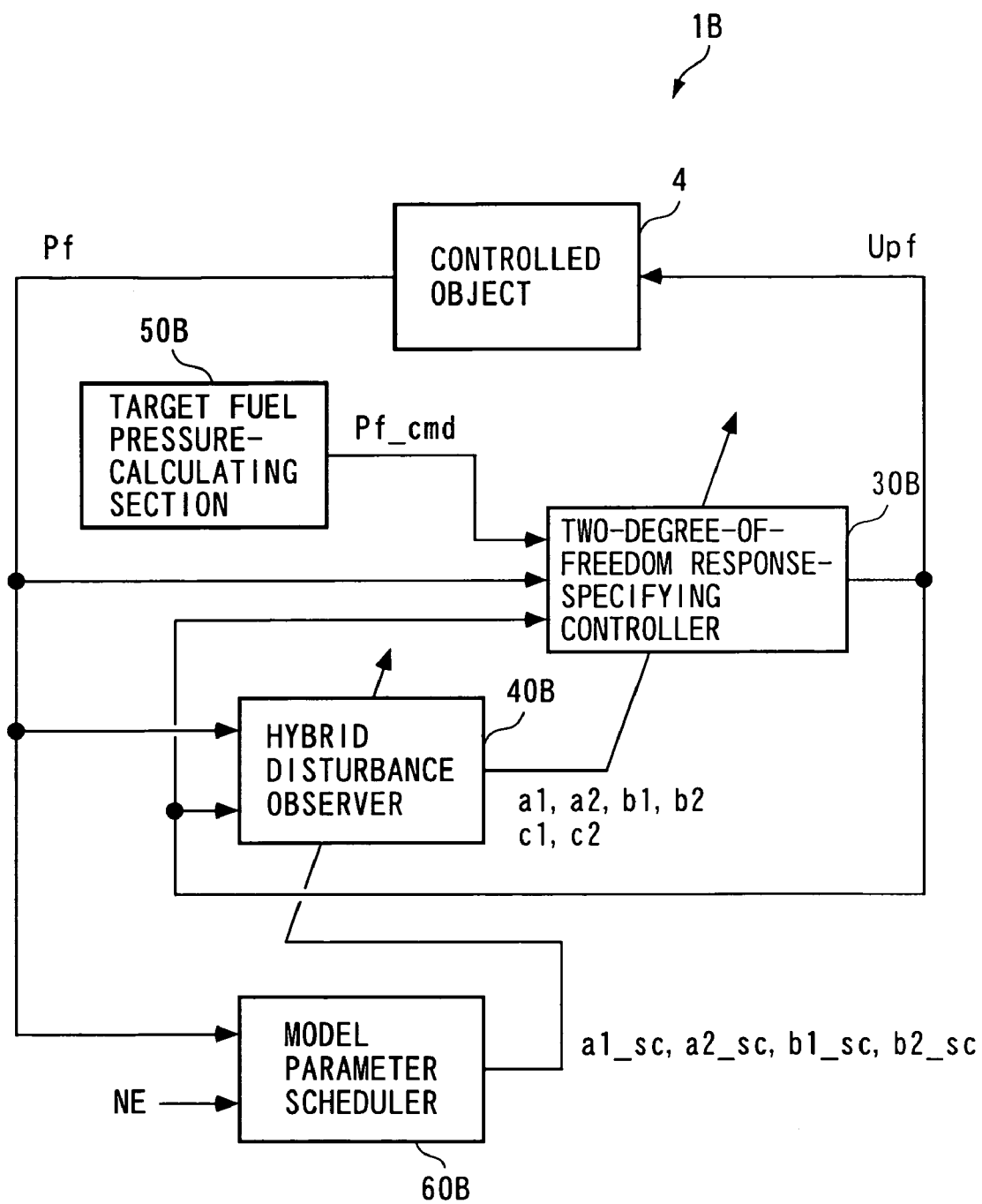
FIG. 12 is a schematic block diagram of a controller according to a third embodiment of the present invention.

As shown in FIG. 12, the controller 1B is comprised of a two-degree-of-freedom response-specifying controller 30B, a hybrid disturbance observer 40B, a target fuel pressure-calculating section 50B, and a model parameter scheduler 60B, which are implemented by the ECU 2. In the present embodiment, the two-degree-of-freedom response-specifying controller 30B corresponds to the control input-calculating means, the hybrid disturbance observer 40B to the estimated control amount-calculating means, the first disturbance estimate-calculating means, the second disturbance estimate-calculating means, and the identification means, and the target fuel pressure-calculating section 50B to the target control amount-setting means.

First, the target fuel pressure-calculating section 50B calculates the target fuel pressure Pf_cmd in the same manner as by the target fuel pressure-calculating section 50. Further, the model parameter scheduler 60B, first, calculates reference values a1_sc, a2_sc, b1_sc, and b2_sc of the respective model parameters a1, a2, b1, and b2 using the following equations (38) to (41), respectively:

$$a1\_sc(k) = a1\_base(k) \tag{38}$$

$$a2\_sc(k) = a2\_base(k) \tag{39}$$

$$b1\_sc(k) = b1\_base(k) \cdot Kne(k) \tag{40}$$

$$b2\_sc(k) = b2\_base(k) \cdot Kne(k) \tag{41}$$

In the equations (38) to (41), the retrieved values a1_base, a2_base, b1_base, and b2_base and the correction coefficient Kne are calculated by searching the tables 10 and 11, respectively.

Further, the hybrid disturbance observer 40B calculates the first and second disturbance estimates c1 and c2 and the model parameters a1, a2, b1, and b2 as follows. It should be noted that an algorithm described below is derived based on the same controlled object model as that for the hybrid disturbance observer 40A.

First, a description will be given of a method of calculating the first disturbance estimate c1. When two vectors θ and ζ are set assuming that transposed matrices thereof are expressed by the following equations (42) and (43), respectively, the first disturbance estimate c1 is calculated using these vectors θ and ζ with an algorithm as a combination of an estimation algorithm, a rate limit algorithm, and a low-pass filter algorithm as expressed by the following equations (44) to (50).

$$\theta^T(k) = [a1(k), a2(k), b1(k), b2(k), c2(k)] \tag{42}$$

$$\zeta^T(k) = [Pf(k-1), Pf(k-2), \tag{43}$$
$$Upf(k-1), Upf(k-2), b1(k-1)]$$

$$\begin{aligned}Pf\_hat(k) &= \theta^T(k-1) \cdot \zeta(k) \\ &= a1(k-1) \cdot Pf(k-1) + a2(k-1) \cdot Pf(k-2) + \\ &\quad b1(k-1) \cdot Upf(k-1) + b2(k-1) \cdot \\ &\quad Upf(k-2) + b1(k-1) \cdot c2(k-1)\end{aligned} \tag{44}$$

$$e\_dov(k) = Pf(k) - Pf\_hat(k) \tag{45}$$

$$c1(k) = -Q \cdot c1(k-1) + (1+Q) \cdot c1^*(k) \tag{46}$$

$$c1^*(k) = c1^*(k-1) + c1^{**}(k) \tag{47}$$

· When $EPS < e\_dov(k) - e\_dov(k-1) \; c1^{**}(k) = EPS$ (48)

· When $-EPS \leq e\_dov(k) - e\_dov(k-1) \leq EPS$ (49)
$c1^{**}(k) = e\_dov(k) - e\_dov(k-1)$ · When $-EPS > e\_dov(k) - e\_dov(k-1)$ (50)
$c1^{**}(k) = -EPS$ On the other hand, the model parameters a1, a2, b1, and b2 and the second disturbance estimate c2 are calculated with a variable-gain sequential identification algorithm (disturbance estimation algorithm) to which a δ correcting method is applied. The algorithm is expressed by the following equations (51) to (56).

$$\theta(k) = \theta sc(k) + d\theta(k) \tag{51}$$

$$d\theta(k) = \delta \cdot d\theta(k-1) + \frac{P \cdot \zeta(k)}{1 + \zeta^T(k) \cdot P \cdot \zeta(k)} e\_dov\_H(k) \tag{52}$$

$$e\_dov\_H(k) = e\_dov(k) - c1(k) \tag{53}$$

$$\theta sc^T(k) = [a1\_sc(k), a2\_sc(k), b1\_sc(k), b2\_sc(k), 0] \tag{54}$$

$$d\theta^T(k) = [da1(k), da2(k), db1(k), db2(k), dc2(k)] \tag{55}$$

$$\delta = \begin{bmatrix} \delta 1 & 0 & 0 & 0 & 0 \\ 0 & \delta 2 & 0 & 0 & 0 \\ 0 & 0 & \delta 3 & 0 & 0 \\ 0 & 0 & 0 & \delta 4 & 0 \\ 0 & 0 & 0 & 0 & \delta 5 \end{bmatrix} \tag{56}$$

In the equation (51), the symbol θ sc represents a reference-value vector of the model parameters and the second disturbance estimate c2, and its transposed matrix is defined by the equation (54). Further, the symbol dθ represents a correction-term vector whose transposed matrix is defined by the equation (55). The symbold da1, da2, db1, db2, and dc2 in the equation (55) represent respective correction terms of the model parameters a1, a2, b1, and b2 and the second disturbance estimate c2. The correction-term vector dθ is calculated using the equation (52). In the equation (52), the symbol P represents a fixed identification gain, and the symbol δ represents a forgetting-coefficient vector defined by the equation (56). The symbol δi (i=1 to 5) in the equation (56) represents a forgetting coefficient. The forgetting coefficient δi is set to a value satisfying the relationship of 0<δi<1. It should be noted that if the forgetting effect provided by the forgetting-coefficient vector δ is not necessary, the forgetting coefficient δi may be set to 1.

As described above, in the hybrid disturbance observer 40B, the correction-term vector dθ is identified onboard, and the model parameters a1, a2, b1, and b2 and the second disturbance estimate c2 are calculated as values corrected by the identified correction terms. In short, the hybrid disturbance observer 40B also functions as an onboard identifier that identifies the model parameters a1, a2, b1, and b2.

Further, in the two-degree-of-freedom response-specifying controller 30B, the fuel pressure control input Upf is calculated with the same algorithm as used by the aforementioned two-degree-of-freedom response-specifying controller 30A (i.e. using the equations (22) to (27)).

According to the controller 1B of the third embodiment configured as above, the two disturbance estimates c1 and c2 are calculated by the hybrid disturbance observer 40B, and the fuel pressure control input Upf is calculated using the disturbance estimates c1 and c2. Therefore, similarly to the controllers 1 and 1A, it is possible to compensate for the modeling error by the first disturbance estimate c1 not only when the modeling error is relatively small, but also when the modeling error temporarily assumes an excessively large value, by quickly compensating for a portion of the modeling error, which cannot be quickly compensated for by the first disturbance estimate c1 alone, by the second disturbance estimate c2.

Further, in the algorithm for calculating the second disturbance estimate c2, the reference value for the second disturbance estimate c2 in the reference-value vector θsc is set to 0, and in the equation (52), the immediately preceding value dc2 (k−1) of the correction term of the second disturbance estimate c2 is multiplied by the forgetting coefficient δ5. Therefore, owing to the forgetting effect provided by the forgetting coefficient δ5, the correction term dc2 of the second disturbance estimate c2 progressively converges to a value of 0 as the computation proceeds, and finally the second disturbance estimate c2 converges to its reference value set to 0. As a consequence, interaction between the two disturbance estimates c1 and c2 can be avoided similarly to the controllers 1 and 1A. It should be noted that even when the reference value for the correction term dc2 is set to a value other than 0, the correction term dc2 eventually converges to its reference value, and therefore the same advantageous effects as described above can be obtained.

Further, in the controller 1B, the hybrid disturbance observer 40B also functions as an onboard identifier as described above, and the model parameters a1, a2, b1, and b2 are identified onboard with the variable-gain sequential identification algorithm to which the δ correcting method is applied. Therefore, even when the dynamic characteristic of the controlled object 4 changes due to aging of the solenoid control valve 15 or variation between individual products thereof, it is possible to calculate the model parameters a1, a2, b1, and b2 while quickly causing the change in the dynamic characteristic to be reflected in the calculation. With this configuration of the controller of the present embodiment, the stability and control accuracy of the fuel pressure control system can be further enhanced compared with the controller 1A of the second embodiment which uses the model parameters a1, a2, b1, and b2 set by the model parameter scheduler 60A.

Although in the third embodiment, the variable-gain sequential identification algorithm is used as an identification algorithm with which the hybrid disturbance observer 40B identifies the second disturbance estimate c2, this is not limitative, but any other algorithm, such as a least-squares algorithm, which is capable of onboard identification may be employed. Further, an onboard identifier that identifies the model parameters a1, a2, b1, and b2 with the least-squares algorithm or the like identification algorithm may be used in place of the model parameter scheduler 60B.

Next, a controller 1C according to a fourth embodiment of the present invention will be described with reference to FIG. 13. This controller 1C is configured to control a phase Cain of an intake camshaft, not shown, with respect to a crankshaft (hereinafter simply referred to as "the cam phase"), not shown, as described hereinbelow. In the following description, component parts and elements similar to those of the controller 1 are designated by identical reference numerals, and detailed description thereof is omitted.

Figure 13:
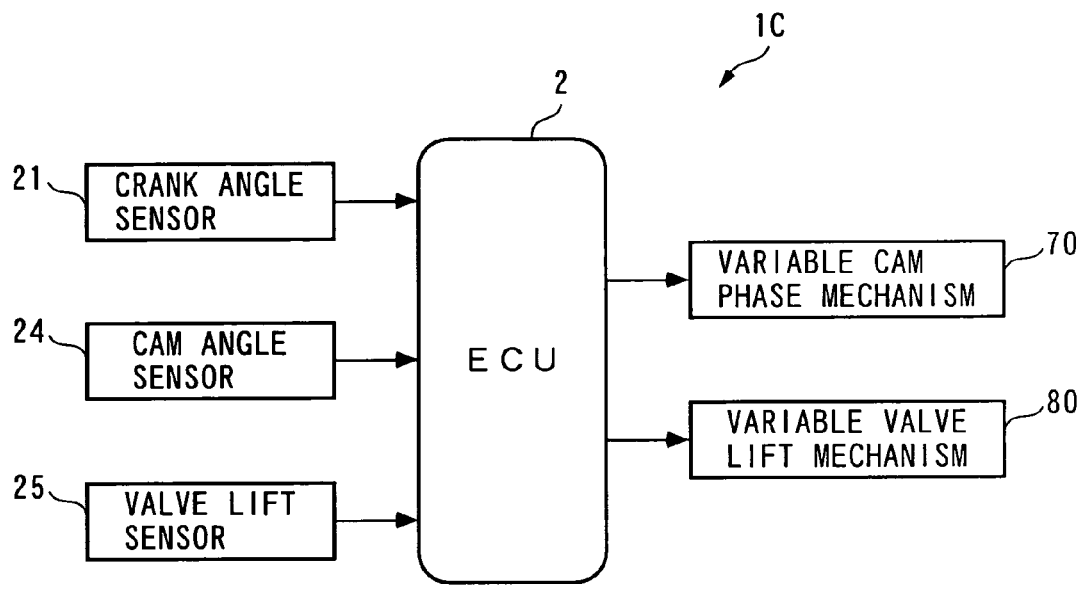
FIG. 13 is a schematic diagram of a hardware configuration of a controller according to a fourth embodiment of the present invention.

As shown in FIG. 13, the controller 1C includes the ECU 2, and the ECU 2 is connected to a crank angle sensor 21, a cam angle sensor 24, a valve lift sensor 25, a variable cam phase mechanism 70, and a variable valve lift mechanism 80. The cam angle sensor 24 is comprised e.g. of a magnet rotor and an MRE pickup, and delivers a CAM signal, which is a pulse signal, to the ECU 2 along with rotation of the intake camshaft. Each pulse of the CAM signal is generated whenever the intake camshaft rotates through a predetermined cam angle (e.g. 1°), and the ECU 2 calculates the cam phase Cain based on the CAM signal and the aforementioned CRK signal. In the present embodiment, the cam angle sensor 24 corresponds to the control amount-detecting means, and the cam phase Cain corresponds to the control amount.

The valve lift sensor 25 delivers to the ECU 2 a signal indicative of a sensed valve lift Liftin which is a maximum lift of an intake valve, not shown.

The variable cam phase mechanism 70 continuously advances or retards the cam phase Cain within a predetermined range by a phase control input Ucain from the ECU 2. The variable cam phase mechanism 70 is similar in configuration to one proposed by the present assignee e.g. in Japanese Patent Application No. 2003-359810, and therefore detailed description thereof is omitted.

The variable valve lift mechanism 80 continuously changes the valve lift Liftin within a predetermined range by a control input from the ECU 2. The variable valve lift mechanism 80 is similar in configuration to one proposed by the present assignee e.g. in Japanese Patent Application No. 2003-359810, and therefore detailed description thereof is omitted.

Next, the controller 1C will be described with reference to FIG. 14. The controller 1C controls the cam phase Cain as a control amount by inputting the phase control input Ucain to a controlled object 5. The controlled object 5 corresponds to a system including the variable cam phase mechanism 70.

Figure 14:
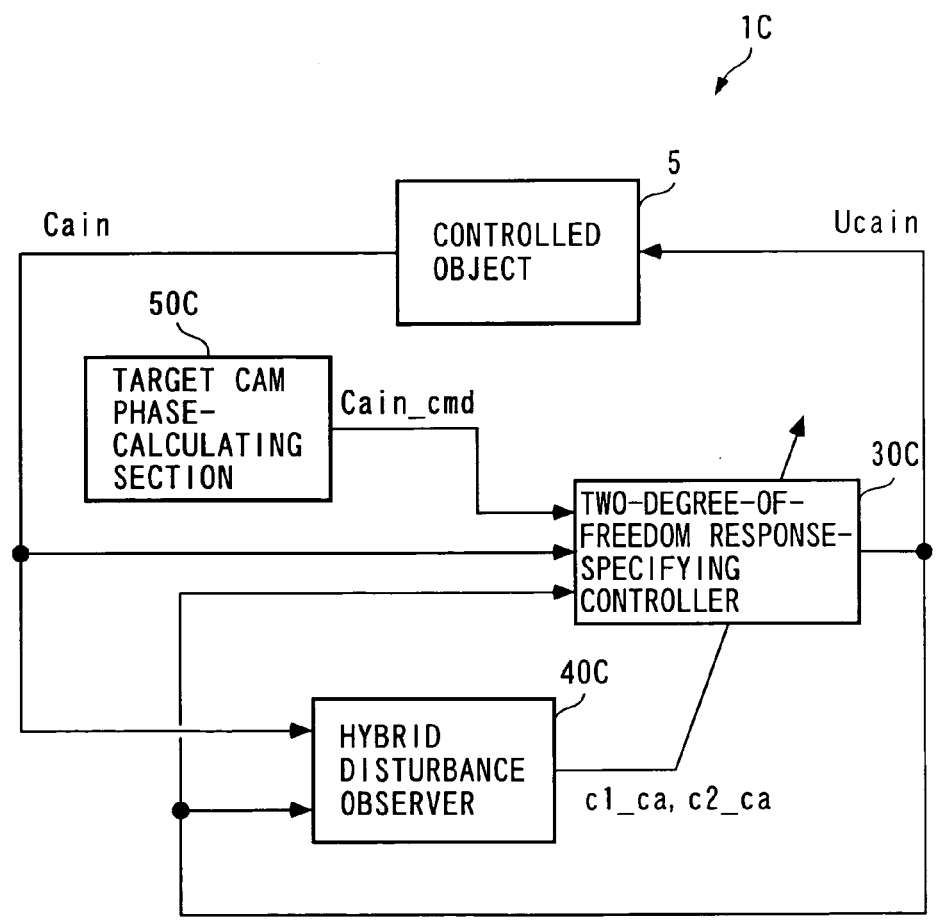
FIG. 14 is a schematic block diagram of the controller according to the fourth embodiment.

As shown in FIG. 14, the controller 1C is comprised of a two-degree-of-freedom response-specifying controller 30C, a hybrid disturbance observer 40C, and a target cam phase-calculating section 50C, which are implemented by the ECU 2. In the present embodiment, the two-degree-of-freedom response-specifying controller 30C corresponds to the control input-calculating means, the hybrid disturbance observer 40C to the estimated control amount-calculating means, the first disturbance estimate-calculating means, and the second disturbance estimate-calculating means, and the target cam phase-calculating section 50C to the target control amount-setting means.

First, the target cam phase-calculating section 50C calculates a target cam phase Cain_cmd (target control amount)

by searching a map or a table, not shown, according to the operating conditions of the engine 3. Then, the two-degree-of-freedom response-specifying controller 30C calculates the phase control input Ucain based on the target cam phase Cain_cmd and the cam phase Cain, with a target value filter-type two-degree-of-freedom response-specifying algorithm expressed by the following equations (57) to (62):

$$Cain\_cmd\_f(k) = -R\_ca \cdot Cain\_cmd\_f(k-1) + \\ (1 + R\_ca) \cdot Cain\_cmd(k) \quad (57)$$

$$Ucain(k) = Ueq\_ca(k) + Urch\_ca(k) \quad (58)$$

$$Ueq\_ca(k) = \frac{1}{b1\_ca}\{(1 - a1\_ca - S\_ca) \cdot Cain(k) + \\ (S\_ca - a2\_ca) \cdot Cain(k-1) - b2\_ca \cdot Ucain \\ (k-1) - c1\_ca(k) - c2\_ca(k) + Cain\_cmd\_f(k) + \\ (S\_ca - 1) \cdot Cain\_cmd\_f(k-1) - \\ S\_ca \cdot Cain\_cmd\_f(k-2)\} \quad (59)$$

$$Urch\_ca(k) = -\frac{Krch\_ca}{b1\_ca}\sigma\_ca(k) \quad (60)$$

$$\sigma\_ca(k) = Ecain(k) + S\_ca \cdot Ecain(k-1) \quad (61)$$

$$Ecain(k) = Cain(k) - Cain\_cmd\_f(k-1) \quad (62)$$

In the equation (57), the symbol Cain_cmd_f represents a filtered value of the target cam phase, and the symbol R_ca represents a target value filter-setting parameter. The target value filter-setting parameter R_ca is set such that the relationship of −1<R_ca<0 holds. In the equation (59), the symbols a1_ca, a2_ca, b1_ca, and b2_ca represent model parameters of a controlled object model, described hereinafter, and the model parameters are each set to a predetermined fixed value. Further, the symbols c1_ca and c2_ca in the equation (59) represent first and second disturbance estimates, respectively. The first and second disturbance estimates c1_ca and c2_ca are calculated by the hybrid disturbance observer 40C, as described hereinafter. Furthermore, in the equation (59), the symbol S_ca represents a switching function-setting parameter. The switching function-setting parameter S_ca is set to a value satisfying the relationship of −1<R_ca<S_ca<0. In the equation (60), the symbol Krch_ca represents a predetermined reaching law gain, and the symbol σ_ca represents a switching function defined by the equation (61). The symbol Ecain in the equation (61) represents a follow-up error, which is calculated using the equation (62).

The equations (57) to (62) are derived as follows: When the controlled object 5 is defined as a system to which the phase control input Ucain is inputted as a control input, using the cam phase Cain as a control amount, and in which the first and second disturbance estimates c1_ca and c2_ca represent disturbance inputs, and this system is modeled into a discrete-time system model, the following equation (63) is obtained:

$$Cain(k+1)a1\_ca \cdot Cain(k) + a2\_ca \cdot Cain(k-1) + \\ b1\_ca \cdot Ucain(k) + b2\_ca \cdot Ucain(k-1+c1\_ca+c2\_ca \quad (63)$$

When the target value filter-type two degree-of-freedom response-specifying control theory is applied to the controlled object model obtained by discretizing the first and second disturbance estimates c1 and c2 in the equation (63), such that the cam phase Cain converges to the target cam phase Cain_cmd, the equations (57) to (62) are derived.

Next, a description will be given of the hybrid disturbance observer 40C. The hybrid disturbance observer 40C calculates the first disturbance estimate c1_ca and the second disturbance estimate c2_ca based on the cam phase Cain and the phase control input Ucain, as follows:

The first disturbance estimate c1_ca is calculated using the following equations (64) to (70):

$$Cain\_hat(k) = a1\_ca \cdot Cain(k-1) + a2\_ca \cdot Cain(k-2) + \\ b1\_ca \cdot Ucain(k-1) + b2\_ca \cdot Ucain(k-2) + \\ c2\_ca(k-1) \quad (64)$$

$$e\_dovca(k) = Cain(k) - Cain\_hat(k) \quad (65)$$

$$c1\_ca(k) = -Q\_ca \cdot c1\_ca(k-1) + (1+Q\_ca) \cdot ca^*(k) \quad (66)$$

$$c1\_ca^*(k-1) + c1\_ca^{**}(k) \quad (67)$$

$$\cdot \text{When } EPS < e\_dov(k) - e\_dov(k-1) c1^{**}(k) = EPS \quad (68)$$

$$\cdot \text{When } -EPS \leq e\_dov(k) - e\_dov(k-1) \leq EPS \\ c1^{**}(k) = e\_dov(k) - e\_dov(k-1) \quad (69)$$

$$\cdot \text{When } -EPS > e\_dov(k) - e\_dov(k-1) \\ c1^{**}(k) = -EPS \quad (70)$$

The symbol Cain_hat in the equation (64) represents an estimate (estimated control amount) of the cam phase Cain, and the symbol e_dovca in the equation (65) represents a first estimation error (first difference). Further, in the equation (66), the symbol Q_ca represents a filter coefficient set to a value satisfying the relationship of −1<Q_ca≦0. The symbol c1_ca* in the equation (66) represents a limited value of the first disturbance estimate c1_ca. The limited value c1_ca* is calculated with a rate limit algorithm expressed by the equations (67) to (70). In the equation (67), the symbol c1_ca** represents a value corresponding to the change amount of the limited value c1_ca*. The value c1_ca** is calculated by subjecting the deviation [e_dovca(k)−e_dovca(k−1)] between current and immediately preceding values of the first estimation error to a limiting process with a value −ESP_ca as a lower limit value and a value EPS_ca as an upper limit value, as expressed by the equations (68) to (70). It should be noted that the value EPS_ca is set to a predetermined positive value.

The second disturbance estimate c2_ca is calculated with a fixed gain identification algorithm (disturbance estimation algorithm) expressed by the following equations (71) and (72):

$$c2\_ca(k) = \lambda\_ca \cdot c2\_ca(k-1) + \frac{Pdovca}{1+Pdovca} \cdot e\_dovca\_H(k) \quad (71)$$

$$e\_dovca\_H(k) = e\_dovca(k) - c1\_ca(k) \quad (72)$$

In the equation (71), the symbol λ_ca represents a forgetting coefficient. The forgetting coefficient λ_ca is set to a value satisfying the relationship of 0<λ_ca<1. It should be noted that if the forgetting effect provided by the forgetting coefficient λ_ca is not necessary, the forgetting coefficient λ_ca may be set to 1. Further, the symbol Pdovca in the equation (71) represents a predetermined identification gain (fixed value), and the symbol e_dovca_H represents a second estimation error (second difference) calculated using the equation (72).

As described above, according to the controller 1C of the present embodiment, the first disturbance estimate c1_ca and the second disturbance estimate c2_ca are calculated by the hybrid disturbance observer 40C, and then the phase control input Ucain is calculated using the first and second disturbance estimates c1_ca and c2_ca. In this case, the first disturbance estimate c1_ca is calculated with an algorithm as a combination of the rate limit algorithm and the low-pass filter algorithm, so that the first disturbance estimate c1_ca is obtained as a value provided with a predetermined delay characteristic. Therefore, in the steady state in which the modeling error is relatively small, the modeling error can be compensated for by the first disturbance estimate c1_ca.

Further, since the second disturbance estimate c2_ca is calculated based on the second estimation error e_dovca_H as the difference between the first estimation error e_dovca and the first disturbance estimate c1_ca, with the fixed gain identification algorithm, even in a transient state in which the modeling error temporarily assumes an excessively large value due to a very large disturbance or a sudden change in the target cam phase Cain_cmd, a portion of the modeling error, which cannot be compensated for by the first disturbance estimate c1_ca alone, can be quickly compensated for by the second disturbance estimate c2_ca.

Furthermore, with the calculation algorithm of the second disturbance estimate c2_ca, the immediately preceding value c2_ca(k−1) of the second disturbance estimate c2_ca is multiplied by the forgetting coefficient λ_ca, and hence owing to the forgetting effect provided by the forgetting coefficient λ_ca, the second disturbance estimate c2_ca is calculated such that it progressively converges to a value of 0 as the computation proceeds. This makes it possible to compensate for the portion of the modeling error, which cannot be compensated for by the first disturbance estimate c1_ca alone, by the second disturbance estimate c2_ca in the transient state in which the modeling error temporarily assumes an excessively large value, as well as to appropriately compensate for the modeling error by the first disturbance estimate c1_ca alone when the controlled object model returns, with the lapse of time, to the steady state where the modeling error is relatively small. In short, it is possible to avoid interaction between the two disturbance estimates c1_ca and c2_ca, thereby further enhancing the stability of the cam phase control system.

Next, a controller 1D according to a fifth embodiment of the present invention will be described with reference to FIG. 15. Similarly to the above described controller 1C, the controller 1D is configured to control the cam phase Cain by the phase control input Ucain. The controller 1D is distinguished from the controller 1C of the fourth embodiment only by its control algorithm.

Figure 15:
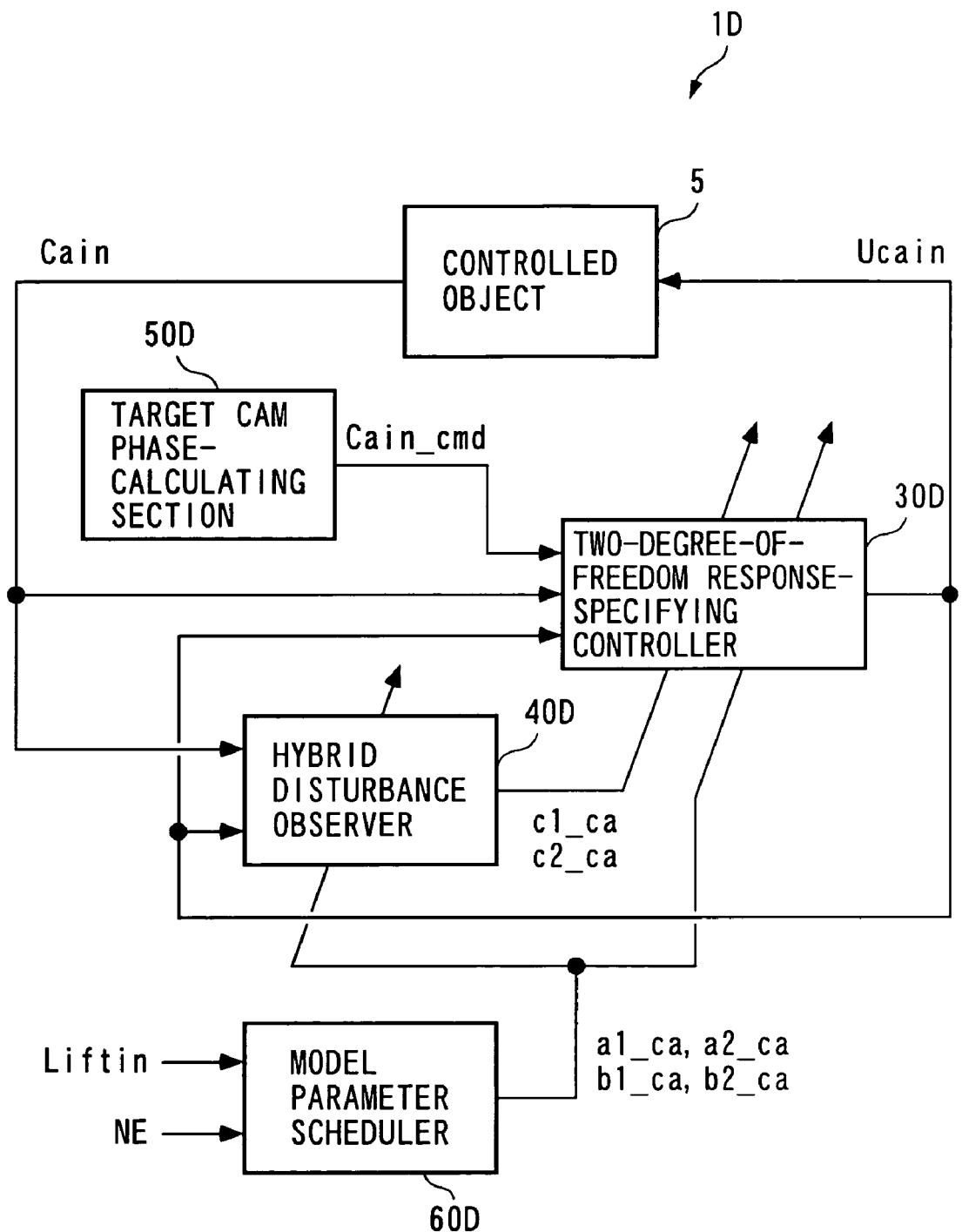
FIG. 15 is a schematic block diagram of a controller according to a fifth embodiment of the present invention.

As shown in FIG. 15, the controller 1D is comprised of a two-degree-of-freedom response-specifying controller 30D, a hybrid disturbance observer 40D, a target cam phase-calculating section 50D, and a model parameter scheduler 60D, which are implemented by the ECU 2. In the present embodiment, the two-degree-of-freedom response-specifying controller 30D corresponds to the control input-calculating means, the hybrid disturbance observer 40D to the estimated control amount-calculating means, the first disturbance estimate-calculating means, and the second disturbance estimate-calculating means, the target cam phase-calculating section 50D to the target control amount-setting means, and the model parameter scheduler 60D to the model parameter-setting means.

First, in the target cam phase-calculating section 50D, the target cam phase Cain_cmd is calculated by the same method as used by the target cam phase-calculating section 50C. Further, in the model parameter scheduler 60D, model parameters a1_ca, a2_ca, b1_ca, and b2_ca are calculated with the following equations (73) to (76), respectively:

$$a1\_ca(k)=a1\_ca\_base(k) \quad (73)$$

$$a2\_ca(k)=a2\_ca\_base(k) \quad (74)$$

$$b1\_ca(k)=b1\_ca\_base(k) \cdot Kne\_ca(k) \quad (75)$$

$$b2\_ca(k)=b2\_ca\_base(k) \cdot Kne\_ca(k) \quad (76)$$

Figure 16:
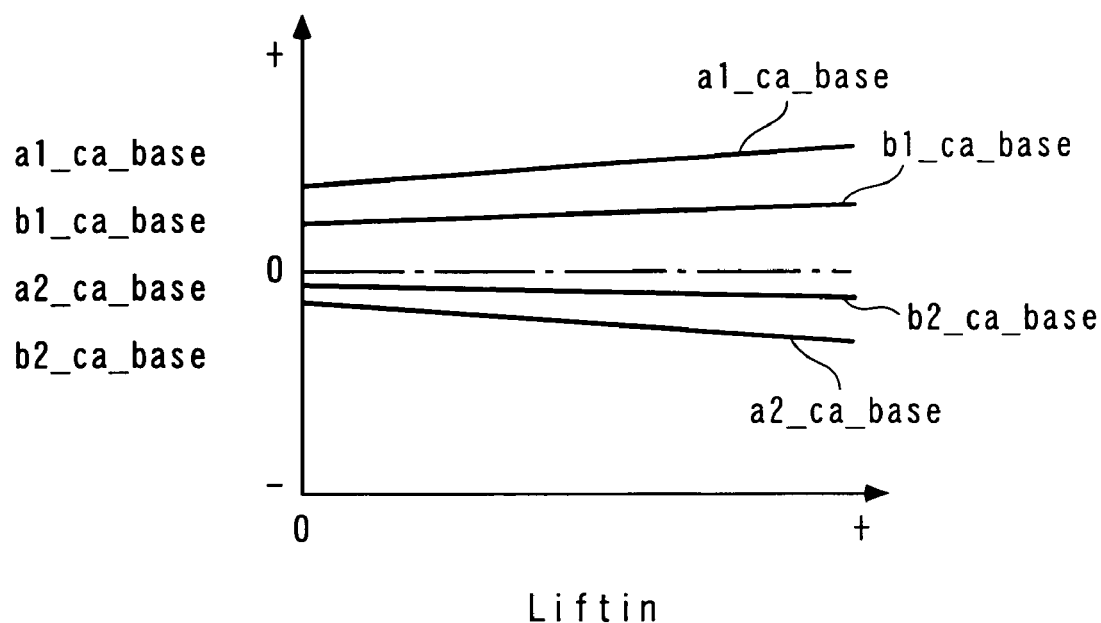
FIG. 16 is a diagram showing an example of a table for use in the calculation of retrieved values of model parameters by a model parameter scheduler of the fifth embodiment.

The symbols a1_ca_base, a2_ca_base, b1_ca_base, and b2_ca_base in the equations (73) to (76) represent retrieved values of the respective model parameters a1_ca, a2_ca, b1_ca, and b2_ca. These retrieved values are specifically calculated by searching a table shown in FIG. 16 according to the valve lift Liftin. As shown in FIG. 16, each of the retrieved values a1_ca_base and a2_ca_base is set such that its absolute value becomes larger with increase in the valve lift Liftin. This is because with increase in the valve lift Liftin, the reaction force of the intake cam becomes larger to reduce the stability of the cam phase Cain, and hence the absolute values of the model parameters a1_ca and a2_ca are required to set to larger values, respectively, in accordance with the reduction of the stability of the cam phase Cain. Similarly, each of the retrieved values b1_ca_base and b2_ca_base is set such that its absolute value becomes larger with increase in the valve lift Liftin. This is because the change gain of the cam phase Cain with respect to the phase control input Ucain becomes larger with increase in the valve lift Liftin, and hence the absolute values of the model parameters b1_ca and b2_ca are set to larger values, respectively, in accordance with the increase in the change gain of the cam phase Cain.

Figure 17:
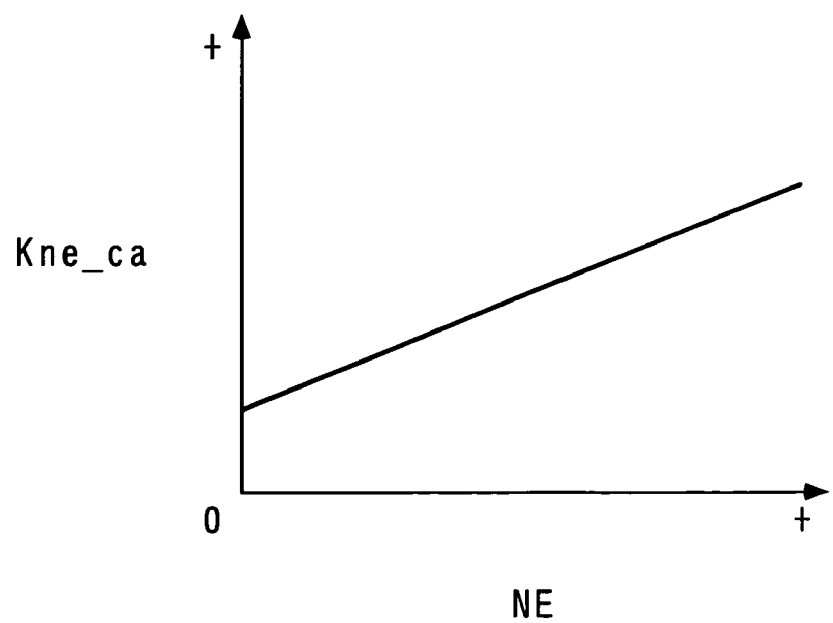
FIG. 17 is a diagram showing an example of a table for use in the calculation of a correction coefficient by the model parameter scheduler of the fifth embodiment.

Further, in the equations (75) and (76), the symbol Kne_ca represents a correction coefficient. More specifically, the correction coefficient Kne_ca is calculated by searching a table shown in FIG. 17 according to the engine speed NE. As shown in FIG. 17, the correction coefficient Kne_ca is set to a lager value as the engine speed NE is higher. This is because as the engine speed NE is higher, the cam reaction force generated per unit time becomes larger, which increases the change gain of the cam phase Cain with respect to the phase control input Ucain, so that it is required to set the absolute values of the model parameters b1_ca and b2_ca to larger values in accordance with the increase in the change gain of the cam phase Cain. In the present embodiment, the valve lift Liftin and the engine speed NE correspond to the parameters indicative of the state of the controlled object.

The two-degree-of-freedom response-specifying controller 30D calculates the phase control input Ucain with a target value filter-type two-degree-of-freedom response-specifying algorithm expressed by the following equations (77) to (82):

$$Cain\_cmd\_f(k) = -R\_ca \cdot Cain\_cmd\_f(k-1) + \\ (1+R\_ca) \cdot Cain\_cmd(k) \quad (77)$$

-continued $$Ucain(k) = Ueq\_ca(k) + Urch\_ca(k) \quad (78)$$

$$Ueq\_ca(k) = \frac{1}{b1\_ca(k)}\{(1 - a1\_ca(k) - S\_ca) \cdot Cain(k) + \\ (S\_ca - a2\_ca(k)) \cdot Cain(k-1) - \\ b2\_ca(k) \cdot Ucain(k-1) - c1\_ca(k) - \\ b1\_ca(k) \cdot c2\_ca(k) + Cain\_cmd\_f \\ (k) + (S\_ca - 1) \cdot Cain\_cmd\_f(k-1) - \\ S\_ca \cdot Cain\_cmd\_f(k-2)\} \\ = \frac{1}{b1\_ca(k)}\{(1 - a1\_ca(k) - S\_ca) \cdot Cain(k) + \\ (S\_ca - a2\_ca(k)) \cdot Cain(k-1) - \\ b2\_ca(k) \cdot Ucain(k-1) - c1\_ca(k) + \\ Cain\_cmd\_f(k) + (S\_ca - 1) \cdot \\ Cain\_cmd\_f(k-1) - S\_ca \cdot \\ Cain\_cmd\_f(k-2)\} - c2\_ca(k) \quad (79)$$

$$Urch\_ca(k) = -\frac{Krch\_ca}{b1\_ca}\sigma\_ca(k) \quad (80)$$

$$\sigma\_ca(k) = Ecain(k) + S\_ca \cdot Ecain(k-1) \quad (81)$$

$$Ecain(k) = Cain(k) - Cain\_cmd\_f(k-1) \quad (82)$$

On the other hand, the hybrid disturbance observer 40D calculates the first disturbance estimate c1_ca and the second disturbance estimate c2_ca based on the cam phase Cain and the phase control input Ucain, as follows: First, the first disturbance estimate c1_ca is calculated with an algorithm as a combination of an estimation algorithm, a rate limit algorithm, and a low-pass filter algorithm, as expressed by the following equations (83) to (89):

$$Cain\_hat(k) = a1\_ca(k) \cdot Cain(k-1) + a2\_ca(k) \cdot \\ Cain(k-2) + b1\_ca(k) \cdot Ucain(k-1) + \\ b2\_ca(k) \cdot Ucain(k-2) + b1\_ca(k) \cdot \\ c2\_ca(k-1) \quad (83)$$

$$e\_dovca(k) = Cain(k) - Cain\_hat(k) \quad (84)$$

$$c1\_ca(k) = -Q\_ca \cdot c1\_ca(k-1) + (1 + Q\_ca) \cdot c1\_ca^*(k) \quad (85)$$

$$c1\_ca^*(k) = c1\_ca^*(k-1) + c1\_ca^{**}(k) \quad (86)$$

When $EPS\_ca < e\_dovca(k) - e\_dovca(k-1)$ (87)
$c1\_ca^{**}(k) = EPS\_ca$

When $-EPS\_ca \leq e\_dovca(k) - e\_dovca(k-1) \leq EPS\_ca \; c1\_ca^{**}(k) = e\_dovca(k) - e\_dovca(k-1)$ (88)

When $EPS\_ca > e\_dovca(k) - e\_dovca(k-1)$ (89)
$c1\_ca^{**}(k) = -EPS\_ca$

Further, the second disturbance estimate c2_ca is calculated with a variable-gain sequential identification algorithm (disturbance estimation algorithm) expressed by the following equations (90) and (91):

$$c2\_ca(k) = \lambda\_ca \cdot c2\_ca(k-1) + \\ \frac{b1\_ca(k) \cdot Pdovca}{1 + b1\_ca(k) \cdot Pdovca \cdot b1\_ca(k)} e\_dovca\_H(k) \quad (90)$$

$$e\_dovca\_H(k) = e\_dovca(k) - c1\_ca(k) \quad (91)$$

According to the controller 1D of the fifth embodiment configured as above, the two disturbance estimates c1_ca and c2_ca are calculated by the hybrid disturbance observer 40D, and the phase control input Ucain is calculated using the disturbance estimates c1_ca and c2_ca, and hence it is possible to obtain the same advantageous effects as provided by the controller 1C of the fourth embodiment.

More specifically, in the steady state where the modeling error is relatively small, the modeling error can be compensated for by the first disturbance estimate c1_ca, while in the transient state in which the modeling error temporarily assumes an excessively large value, a portion of the modeling error, which cannot be compensated for by the first disturbance estimate c1_ca alone, can be quickly compensated for by the second disturbance estimate c2_ca. Further, since the immediately preceding value c2_ca(k−1) of the second disturbance estimate c2_ca is multiplied by the forgetting coefficient λ_ca in the algorithm for calculating the second disturbance estimate c2_ca, it is possible to avoid interaction between the two disturbance estimates c1_ca and c2_ca.

Additionally, in the controller 1D of the present embodiment, since the model parameter scheduler 60D calculates the model parameters a1_ca and a2_ca according to the valve lift Liftin, and the model parameters b1_ca and b2_ca according to the valve lift Liftin and the engine speed NE, it is possible to calculate the two disturbance estimates c1_ca and c2_ca while causing a change in the dynamic characteristic of the controlled object 5 due to changes in the fuel pressure Pf and the engine speed NE, i.e. a change in the dynamic characteristic between the cam phase Cain and the phase control input Ucain, to be quickly reflected in the calculation and thereby quickly compensate for the modeling error by the disturbance estimates c1_ca and c2_ca. With this configuration of the controller 1D of the present embodiment, the stability and control accuracy of the cam phase control system can be further enhanced compared with the controller 1C of the fourth embodiment in which the predetermined fixed values are used as the respective parameters a1_ca, a2_ca, b1_ca, and b2_ca.

Next, a controller 1E according to a sixth embodiment of the present invention will be described with reference to FIG. 18. Similarly to the above described controllers 1C and 1D, the controller 1E is configured to control the cam phase Cain of the variable cam phase mechanism 70. The controller 1E is distinguished from the controllers 1C and 1D only by its control algorithm.

Figure 18:
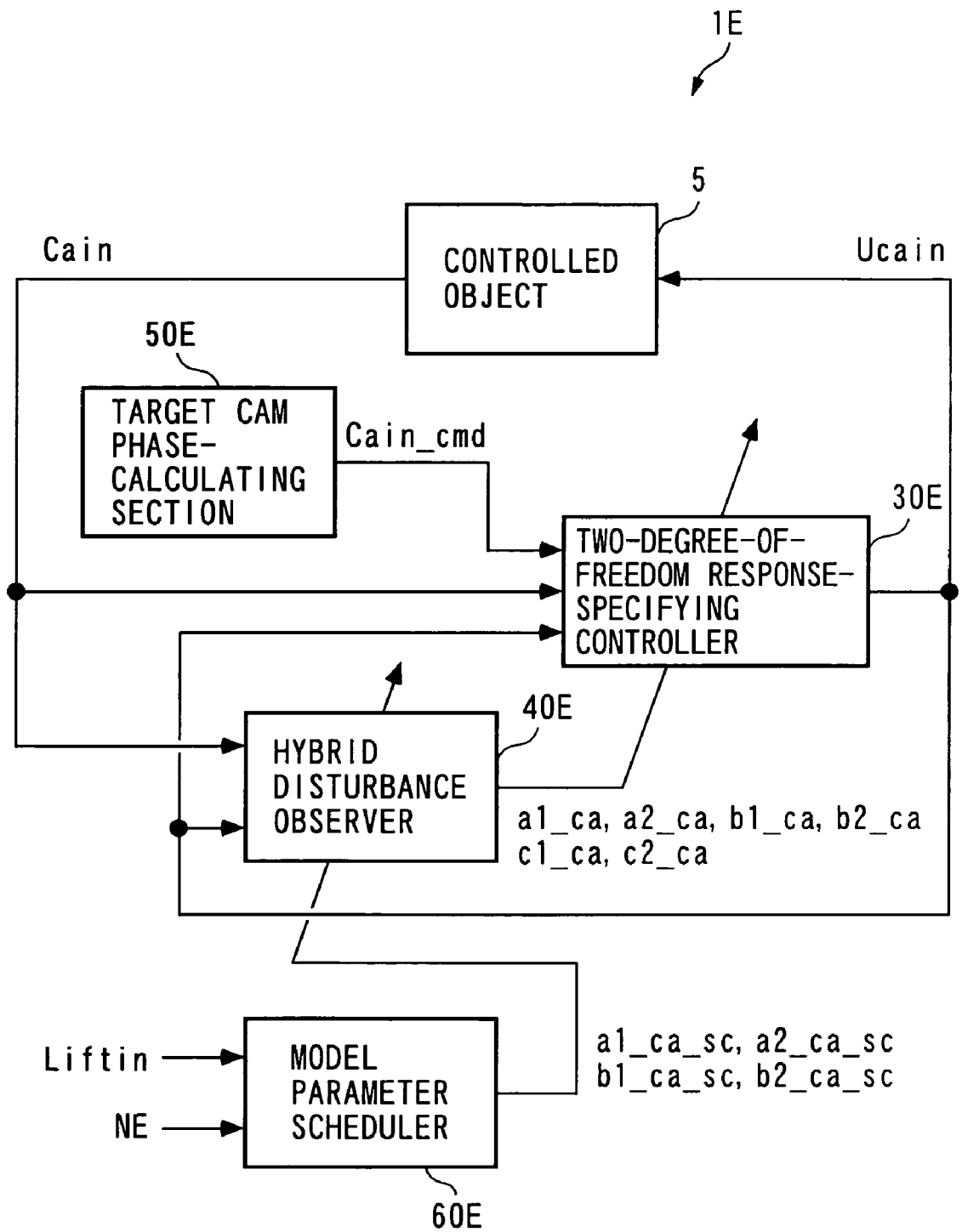
FIG. 18 is a schematic block diagram of a controller according to a sixth embodiment of the present invention.

As shown in FIG. 18, the controller 1E is comprised of a two-degree-of-freedom response-specifying controller 30E, a hybrid disturbance observer 40E, a target cam phase-calculating section 50E, and a model parameter scheduler 60E, which are implemented by the ECU 2. In the present embodiment, the two-degree-of-freedom response-specifying controller 30E corresponds to the control input-calculating means, the hybrid disturbance observer 40E to the estimated control amount-calculating means, the first disturbance estimate-calculating means, the second disturbance estimate-calculating means, and the identification means, and the target cam phase-calculating section 50E to the target control amount-setting means.

First, in the target cam phase-calculating section 50E, the target cam phase Cain_cmd is calculated by the same method as used by the target cam phase-calculating section 50C. Further, in the model parameter scheduler 60E, first, reference values a1_ca_sc, a2_ca_sc, b1_ca_sc, and b2_ca_sc of the respective model parameters a1_ca, a2_ca, b1_ca, and b2_ca are calculated using the following equations (92) to (95), respectively:

$$a1\_ca\_sc(k) = a1\_ca\_base(k) \quad (92)$$

$$a2\_ca\_sc(k) = a2\_ca\_base(k) \quad (93)$$

$$b1\_ca\_sc(k) = b1\_ca\_base(k) \cdot Kne\_ca(k) \quad (94)$$

$$b2\_ca\_sc(k) = b2\_ca\_base(k) \cdot Kne\_ca(k) \quad (95)$$

In the equations (92) to (95), the retrieved values a1_ca_base, a2_ca_base, b1_ca_base, and b2_ca_base and the correction coefficient Kne_ca are calculated by searching the aforementioned tables in FIGS. 16 and 17, respectively.

Further, the hybrid disturbance observer 40E calculates the first disturbance estimate c1_ca, the second disturbance estimate c2_ca, and the model parameters a1_ca, a2_ca, b1_ca, and b2_ca, as follows: First, the first disturbance estimate c1_ca is calculated with an algorithm as a combination of an estimation algorithm, a rate limit algorithm, and a low-pass filter algorithm, as expressed by the following equations (96) to (104):

$$\theta ca^T(k) = \begin{bmatrix} a1\_ca(k), a2\_ca(k), b1\_ca(k) \\ b2\_ca(k), c2\_ca(k) \end{bmatrix} \quad (96)$$

$$\zeta ca^T(k) = \begin{bmatrix} Cain(k-1), Cain(k-2), Ucain(k-1), \\ Ucain(k-2), b1\_ca(k-1) \end{bmatrix} \quad (97)$$

$$Cain\_hat(k) = \theta ca^T(k-1) \cdot \zeta ca^T(k) \quad (98)$$
$$= a1\_ca(k-1) \cdot Cain(k-1) + a2\_ca(k-1) \cdot$$
$$Cain(k-2) + b1\_ca(k-1) \cdot Ucain(k-1) +$$
$$b2\_ca(k-1) \cdot Ucain(k-2) + b1\_ca(k-1) \cdot$$
$$c2\_ca(k-1)$$

$$e\_dovca(k) = Cain(k) - Cain\_hat(k) \quad (99)$$

$$c1\_ca(k) = -Q\_ca \cdot c1\_ca(k-1) + (1 + Q\_ca) \cdot c1\_ca^*(k) \quad (100)$$

$$c1\_ca^*(k) = c1\_ca^*(k-1) + c1\_ca^{**}(k) \quad (101)$$

When $EPS\_ca < e\_dovca(k) - e\_dovca(k-1)$ (102)
$c1\_ca^{**}(k) = EPS\_ca$

When $-EPS\_ca \leq e\_dovca(k) - e\_dovca(k-1) \leq$ (103)
$EPS\_ca$ $c1\_ca^{**}(k) = e\_dovca(k) - e\_dovca(k-1)$ When $EPS\_ca > e\_dovca(k) - e\_dovca(k-1)$ (104)
$c1\_ca^{**}(k) = -EPS\_ca$ On the other hand, the model parameters a1_ca, a2_ca, b1_ca, and b2_ca and the second disturbance estimate c2_ca are calculated with a variable-gain sequential identification algorithm (disturbance estimation algorithm) to which the δ correcting method is applied. The algorithm is expressed by the following equations (105) to (110). That is, the hybrid disturbance observer 40E also functions as an onboard identifier.

$$\theta ca(k) = \theta casc(k) + d\theta ca(k) \quad (105)$$

$$d\theta ca(k) = \delta ca \cdot d\theta ca(k-1) + \quad (106)$$
$$\frac{Pca \cdot \zeta ca(k)}{1 + \zeta ca^T(k) \cdot Pca \cdot \zeta ca(k)} e\_dovca\_H(k)$$

$$e\_dovca\_H(k) = e\_dovca(k) - c1\_ca(k) \quad (107)$$

$$\theta casc^T(k) = \begin{bmatrix} a1\_ca\_sc(k), a2\_ca\_sc(k), \\ b1\_ca\_sc(k), b2\_ca\_sc(k), 0 \end{bmatrix} \quad (108)$$

$$d\theta ca^T(k) = \begin{bmatrix} da1\_ca(k), da2\_ca(k), db1\_ca(k), \\ db2\_ca(k), dc2\_ca(k) \end{bmatrix} \quad (109)$$

$$\delta ca = \begin{bmatrix} \delta ca1 & 0 & 0 & 0 & 0 \\ 0 & \delta ca2 & 0 & 0 & 0 \\ 0 & 0 & \delta ca3 & 0 & 0 \\ 0 & 0 & 0 & \delta ca4 & 0 \\ 0 & 0 & 0 & 0 & \delta ca5 \end{bmatrix} \quad (110)$$

In the equation (105), the symbol θcasc represents a reference-value vector of the model parameters and the second disturbance estimate, and its transposed matrix is defined by the equation (108). Further, the symbol dθca represents a correction-term vector whose transposed matrix is defined by the equation (109). The symbols da1_ca, da2_ca, db1_ca, db2_ca, and dc2_ca in the equation (109) represent respective correction terms of the model parameters a1_ca, a2_ca, b1_ca, and b2_ca and the second disturbance estimate c2_ca. The correction-term vector dθca is calculated using the equation (106). In the equation (106), the symbol Pca represents a fixed identification gain, and the symbol δca represents a forgetting-coefficient vector defined by the equation (110). The symbol δcai (i=1 to 5) in the equation (110) represents the forgetting coefficient. The forgetting coefficient δcai is set such that 0<δcai<1 holds. It should be noted that if the forgetting effect provided by the forgetting-coefficient vector δca is not necessary, the forgetting coefficient δcai may be set to 1.

The two-degree-of-freedom response-specifying controller 30E calculates the phase control input Ucain with the same control algorithm (i.e. the aforementioned equations (77) to (82)) as used by the two-degree-of-freedom response-specifying controller 30D.

According to the controller 1E of the sixth embodiment configured as above, the two disturbance estimates c1_ca and c2_ca are calculated by the hybrid disturbance observer 40E, and the phase control input Ucain is calculated using the disturbance estimates c1_ca and c2_ca, so that as in the controllers 1C and 1D, it is possible to compensate for the modeling error not only in the steady state where the modeling error. is relatively small, by the first disturbance estimate c1_ca, but also in the transient state where the modeling error temporarily assumes an excessively large value, by quickly compensating for a portion of the modeling error, which cannot be quickly compensated for by the first disturbance estimate c1_ca alone, by the second disturbance estimate c2_ca.

Further, in the algorithm for calculating the second disturbance estimate c2_ca, the reference value of the second disturbance estimate c2_ca in the reference-value vector θcasc is set to 0, and in the equation (106), the immediately preceding value dc2_ca(k−1) of the correction term of the second disturbance estimate is multiplied by the forgetting coefficient θca5. Therefore, owing to the forgetting effect provided by the forgetting coefficient δca5, the correction term dc2_ca of the second disturbance estimate converges to a value of 0 as the computation proceeds, and finally the second disturbance estimate c2_ca converges to its reference value set to 0. As a consequence, interaction between the two disturbance estimates c1_ca and c2_ca can be avoided similarly to the controller 1D.

Further, the hybrid disturbance observer 40E also functions as an onboard identifier as described above, and the model parameters a1_ca, a2_ca, b1_ca, and b2_ca are identified onboard with the variable-gain sequential identification algorithm to which the δ correcting method is applied. Therefore, even when the dynamic characteristic of the controlled object 5 changes due to aging of the variable cam phase mechanism 70 or variation between individuals products thereof, it is possible to calculate the model parameters a1_ca, a2_ca, b1_ca, and b2_ca while causing the change in the dynamic characteristic to be quickly reflected in the calculation. With this configuration of the controller of the present embodiment, the stability and control accuracy of the cam phase control system can be further enhanced compared with the controller 1D of the fifth embodiment which uses the model parameters a1_ca, a2_ca, b1_ca, and b2_ca set by the model parameter scheduler 60D.

Next, a controller 1F according to a seventh embodiment of the present invention will be described with reference to FIG. 19. This controller 1F is configured to control the engine speed NE during idling of the engine as described hereinbelow. In the following description, component parts and elements similar to those of the controller 1 are designated by identical reference numerals, and detailed description thereof is omitted.

Figure 19:
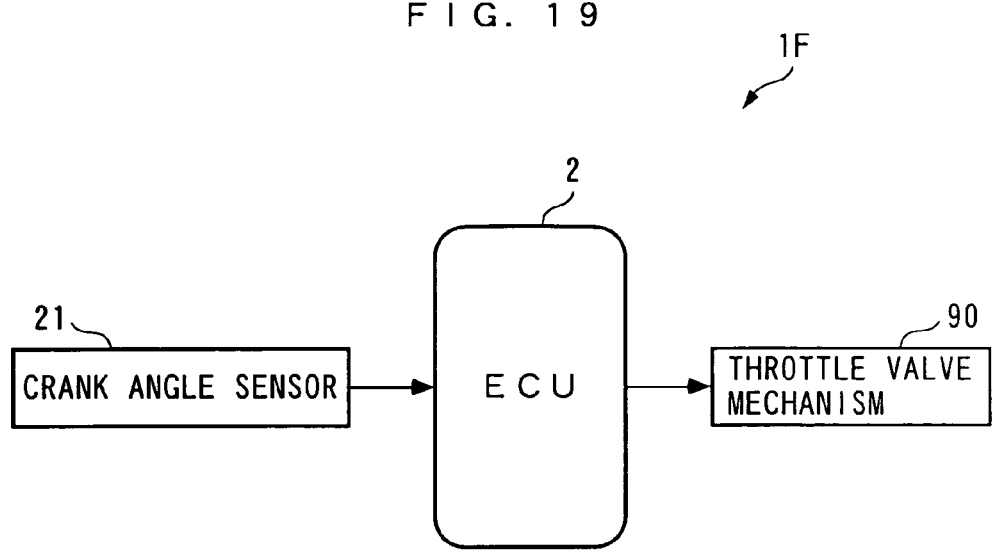
FIG. 19 is a schematic diagram of a hardware configuration of a controller according to a seventh embodiment of the present invention.

As shown in FIG. 19, the controller 1F includes the ECU 2, and the ECU 2 is connected to an electronically controlled throttle valve mechanism 90. The electronically controlled throttle valve mechanism 90 continuously changes the degree of opening of a throttle valve, not shown, in a predetermined range by a rotational speed control input Une from the ECU 2. The throttle valve mechanism 90 is comprised of an electric motor and the throttle valve connected to the electric motor via a gear mechanism. The arrangements of the electric motor and the throttle valve are known, and hence detailed description thereof is omitted.

Next, the controller 1F will be described with reference to FIG. 20. The controller 1F controls the engine speed NE during idling of the engine, as a control amount, by inputting the rotational speed control input Une to a controlled object 6. The controlled object 6 corresponds to a system including the throttle valve mechanism 90.

Figure 20:
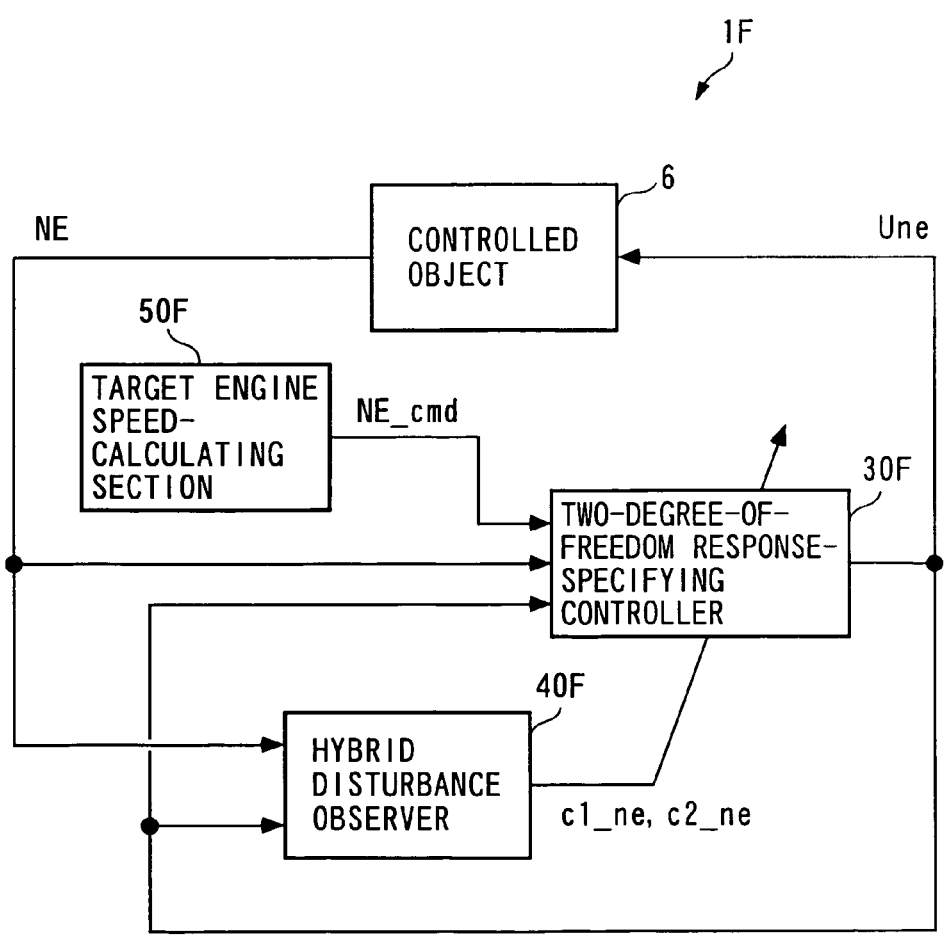
FIG. 20 is a schematic block diagram of the controller according to the seventh embodiment.

As shown in FIG. 20, the controller 1F is comprised of a two-degree-of-freedom response-specifying controller 30F, a hybrid disturbance observer 40F, and a target engine speed-calculating section 50F, which are implemented by the ECU 2. In the present embodiment, the two-degree-of-freedom response-specifying controller 30F corresponds to the control input-calculating means, the hybrid disturbance observer 40F to the estimated control amount-calculating means, the first disturbance estimate-calculating means, and the second disturbance estimate-calculating means, and the target cam phase-calculating section 50F to the target control amount-setting means.

First, the target engine speed-calculating section 50F calculates a target engine speed NE_cmd (target control amount) by searching a map or a table, not shown, according to the engine coolant temperature or the like. Then, the two-degree-of-freedom response-specifying controller 30F calculates the rotational speed input Une based on the target engine speed NE_cmd and the engine speed NE, with a target value filter-type two-degree-of-freedom response-specifying algorithm expressed by the following equations (111) to (116):

$$NE\_cmd\_f(k) = -R\_ne \cdot NE\_cmd\_f(k-1) + \qquad (111)$$
$$(1 + R\_ne) \cdot NE\_cmd(k)$$

$$Une(k) = Ueq\_ne(k) + Urch\_ne(k) \qquad (112)$$

$$Ueq\_ne(k) = \frac{1}{b1\_ne(k)} \{(1 - a1\_ne - S\_ne) \cdot NE(k) + \qquad (113)$$
$$(S\_ne - a2\_ne) \cdot NE(k-1) -$$
$$b2\_ne \cdot Une(k-1) - c1\_ne(k) -$$
$$c2\_ne(k) + NE\_cmd\_f(k) +$$
$$(S\_ne - 1) \cdot NE\_cmd\_f(k-1) -$$
$$S\_ne \cdot NE\_cmd\_f(k-2)\}$$

$$Urch\_ne(k) = -\frac{Krch\_ne}{b1\_ne}\sigma\_ne(k) \qquad (114)$$

$$\sigma\_ne(k) = Ene(k) + S\_ne \cdot Ene(k-1) \qquad (115)$$

$$Ene(k) = NE(k) - NE\_cmd\_f(k-1) \qquad (116)$$

In the equation (111), the symbol NE_cmd_f represents a filtered value of the target engine speed, and the symbol R_ne represents a target value filter-setting parameter. The target value filter-setting parameter R_ne is set such that the relationship of −1<R_ne<0 holds. In the equation (113), the symbols a1_ne, a2_ne, b1_ne, and b2_ne represent model parameters of a controlled object model, described hereinafter, and the model parameters are each set to a predetermined fixed value. Further, the symbols c1_ne and c2_ne in the equation (113) represent first and second disturbance estimates, respectively. The first and second disturbance estimates c1_ne and c2_ne are calculated by the hybrid disturbance observer 40F as described hereinafter. Furthermore, in the equation (113), the symbol S_ne represents a switching function-setting parameter. The switching function-setting parameter S_ne is set to a value satisfying the relationship of −1<R_ne<S_ne<0. In the equation (114), the symbol Krch_ne represents a predetermined reaching law gain, and the symbol σ_ne represents a switching function defined by the equation (115). The symbol Ene in the equation (115) represents a follow-up error, which is calculated using the equation (116).

The equations (111) to (116) are derived as follows: When the controlled object 6 is defined as a system to which the rotational speed control input Une is inputted as a control input, using the engine speed NE as a control amount, and in which the engine speed NE as a control amount, and the first and second disturbance estimates c1_ne and c2_ne represent disturbance inputs, and this system is modeled into a discrete-time system model, the following equation (117) is obtained:

$$NE(k+1) = a1\_ne \cdot NE(k) + a2\_ne \cdot NE(k-1) + b1\_ne \cdot \qquad (117)$$
$$Une(k) + b2\_ne \cdot Une(k+1) c1\_ne + c2\_ne$$

When the target value filter-type two degree-of-freedom response-specifying control theory is applied to the controlled object model obtained by discretizing the first and second disturbance estimates c1_ne and c2_ne in the equation (117), such that the engine speed NE converges to the target engine speed NE_cmd, the equations (111) to (116) are derived.

Next, a description will be given of the hybrid disturbance observer 40F. The hybrid disturbance observer 40F calculates the first disturbance estimate c1_ne and the second disturbance estimate c2_ne based on the engine speed NE and the rotational speed control input Une, as follows:

The first disturbance estimate c1_ne is calculated using the following equations (118) to (124):

$$NE\_hat(k) = a1\_ne \cdot NE(k-1) + a2\_ne \cdot NE(k-2) + b1\_ne \cdot Une(k-1) + b2\_ne \cdot Une(k-2) + c2\_ne(k-1) \quad (118)$$

$$e\_dovne(k) = NE(k) - NE\_hat(k) \quad (119)$$

$$c1\_ne(k) = -Q\_ne \cdot c1ne(k-1) + (1 + Q\_ne) \cdot c1\_ne^*(k) \quad (120)$$

$$c1\_ne^*(k) = c1\_ne^*(k-1) + c1\_ne^{**}(k) \quad (121)$$

When EPS_ne < e_dovne(k) − e_dovne(k−1)

$$c1\_ne^{**}(k) = EPS\_ne \quad (122)$$

When −EPS_ne ≦ e_dovne(k) − e_dovne(k−1) ≦ EPS_ne $$c1\_ne^{**}(k) = e\_dovne(k) - e\_dovne(k-1) \quad (123)$$

When −EPS_ne > e_dovne(k) − e_dovne(k−1)

$$c1\_ne^{**}(k) = -EPS\_ne \quad (124)$$

The symbol NE_hat in the equation (118) represents an estimate (estimated control amount) of the engine speed NE, and the symbol e_dovne in the equation (119) represents a first estimation error (first difference). Further, in the equation (120), the symbol Q_ne represents a filter coefficient set to a value satisfying the relationship of −1 < Q_ne ≦ 0. The symbol c1_ne* represents a limited value of the first disturbance estimate c1_ne. The limited value c1_ne* is calculated with a rate limit algorithm expressed by the equations (121) to (124). In the equation (121), the symbol c1_ne** represents a value corresponding to an amount of change in the limited value c1_ne*. The value c1_ne** is calculated by subjecting the difference [e_dovne(k)−e_dovne(k−1)] between the current and immediately preceding values of the first estimation error to a limiting process with a value −ESP_ne as a lower limit value and a value EPS_ne as an upper limit value, as expressed by the equations (122) to (124). It should be noted that the value EPS_ca is set to a predetermined positive value.

The second disturbance estimate c2_ne is calculated with a fixed gain identification algorithm (disturbance estimation algorithm) expressed by the following equations (125) and (126):

$$c2\_ne(k) = \lambda\_ne \cdot c2\_ne(k-1) + \frac{Pdovne}{1 + Pdovne} \cdot e\_dovne\_H(k) \quad (125)$$

$$e\_dovne\_H(k) = e\_dovne(k) - c1\_ne(k) \quad (126)$$

In the equation (125), the symbol λ_ne represents a forgetting coefficient. The forgetting coefficient λ_ne is set to a value satisfying the relationship of 0 < λ_ne < 1. It should be noted that if the forgetting effect provided by the forgetting coefficient λ_ne is not necessary, the forgetting coefficient λ_ne may be set to 1. Further, the symbol Pdovne in the equation (125) represents a predetermined identification gain (fixed value), and the symbol e_dovne_H represents a second estimation error (second difference) calculated using the equation (126).

As described above, according to the controller 1F of the present embodiment, the first disturbance estimate c1_ne and the second disturbance estimate c2_ne are calculated by the hybrid disturbance observer 40F, and then the rotational speed control input Une is calculated using the first and second disturbance estimates c1_ne and c2_ne. In this case, the first disturbance estimate c1_ne is calculated with an algorithm as a combination of the rate limit algorithm and the low-pass filter algorithm, so that the first disturbance estimate c1_ne is obtained as a value provided with a predetermined delay characteristic. Therefore, in the steady state in which the modeling error is relatively small, the modeling error can be compensated for by the first disturbance estimate c1_ne.

Further, since the second disturbance estimate c2_ne is calculated based on the second estimation error e_dovne_H as the difference between the first estimation error e_dovne and the first disturbance estimate c1_ne, with the fixed gain identification algorithm, even in the transient state in which the modeling error temporarily assumes an excessively large value due to an excessively large disturbance or the like, a portion of the modeling error, which cannot be compensated for by the first disturbance estimate c1_ne alone, can be quickly compensated for by the second disturbance estimate c2_ne.

Furthermore, since the immediately preceding value c2_ne(k−1) of the second disturbance estimate c2_ne is multiplied by the forgetting coefficient λ_ne, owing the forgetting effect provided by the forgetting coefficient λ_ne, the second disturbance estimate c2_ne is calculated such that it progressively converges to a value of 0 as the computation proceeds. This makes it possible to compensate for the portion of the modeling error, which cannot be compensated for by the first disturbance estimate c1_ne alone, by the second disturbance estimate c2_ne in the transient state in which the modeling error temporarily assumes an excessively large value, as well as to appropriately compensate for the modeling error by the first disturbance estimate c1_ne alone when the controlled object model returns, with the lapse of time, to the steady state where the modeling error is relatively small. In short, it is possible to avoid interaction between the two disturbance estimates c1_ne and c2_ne, thereby further enhancing stability of the engine speed control system.

Next, a controller 1G according to an eighth embodiment of the present invention will be described with reference to FIG. 21. Similarly to the above described controller 1F of the seventh embodiment, the controller 1G is configured to control the engine speed NE during idling of the engine by the rotational speed control input Une. The controller 1G is distinguished from the controller 1F of the seventh embodiment only by its control algorithm.

Figure 21:
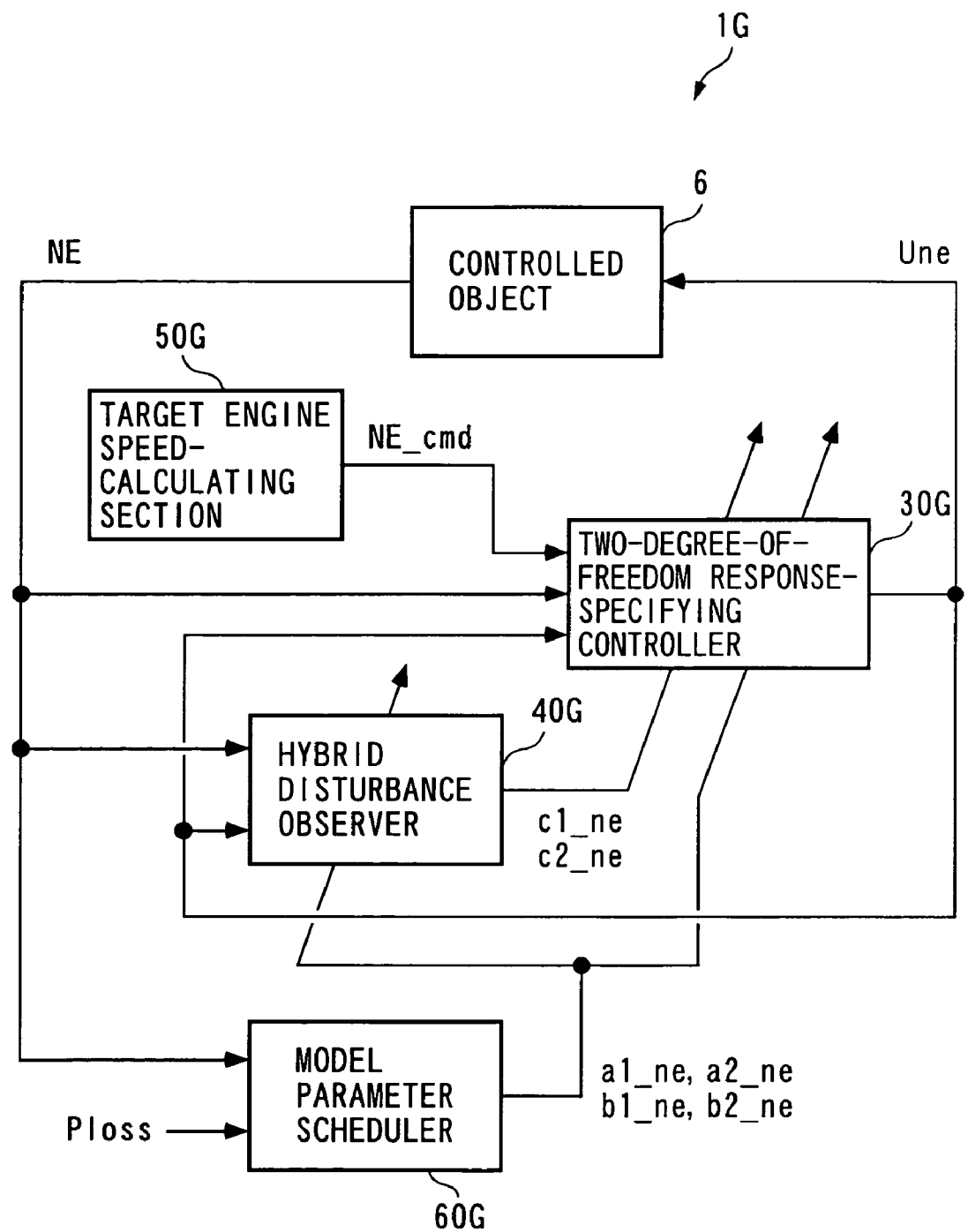
FIG. 21 is a schematic block diagram of a controller according to an eighth embodiment.

As shown in FIG. 21, the controller 1G is comprised of a two-degree-of-freedom response-specifying controller 30G, a hybrid disturbance observer 40G, a target engine speed-calculating section 50G, and a model parameter scheduler 60G, which are implemented by the ECU 2. In the present embodiment, the two-degree-of-freedom response-specifying controller 30G corresponds to the control input-calculating means, the hybrid disturbance observer 40G to the estimated control amount-calculating means, the first disturbance estimate-calculating means, and the second disturbance estimate-calculating means, the target engine speed-calculating section 50G to the target control amount-setting means, and the model parameter scheduler 60G to the model parameter-setting means.

First, the target engine speed-calculating section 50G calculates the target engine speed NE_cmd by the same method as used by the target engine speed-calculating section 50F. Further, the model parameter scheduler 60G calculates model parameters a1_ne, a2_ne, b1_ne, and b2_ne using the following equations (127) to (130), respectively:

$$a1\_ne(k) = a1\_ne\_base(k) \tag{127}$$

$$a2\_ne(k) = a2\_ne\_base(k) \tag{128}$$

$$b1\_ne(k) = b1\_ne\_base(k) \cdot Kls(k) \tag{129}$$

$$b2\_ne(k) = b2\_ne\_base(k) \cdot Kls(k) \tag{130}$$

Figure 22:
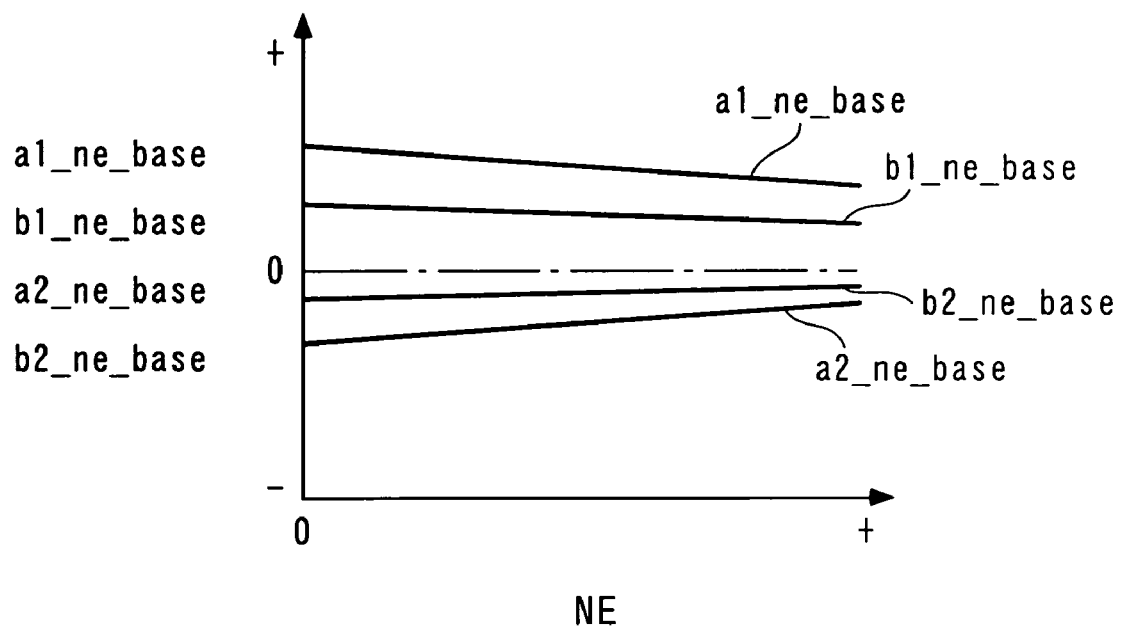
FIG. 22 is a diagram showing an example of a table for use in the calculation of retrieved values of model parameters by a model parameter scheduler of the eighth embodiment.

The symbols a1_ne_base, a2_ne_base, b1_ne_base, and b2_ne_base in the equations (127) to (130) represent retrieved values of the respective model parameters a1_ne, a2_ne, b1_ne, and b2_ne. These retrieved values are specifically calculated by searching a table shown in FIG. 22 according to the engine speed NE. As shown in FIG. 22, each of the retrieved values a1_ne_base and a2_ne_base is set such that its absolute value becomes larger with increase in the engine speed NE. This is because with increase in the engine speed NE, the inertial force of the engine 3 becomes larger to enhance the stability of the engine speed NE, and hence the absolute values of the model parameters a1_ne and a2_ne are required to be set to smaller values, respectively, in accordance with the increase in the engine speed NE. Similarly, each of the retrieved values b1_ne_base and b2_ne_base is set such that its absolute value becomes larger with increase in the engine speed NE. This is because the change gain of the engine speed NE with respect to the rotational speed control input Une becomes larger with increase in the engine speed NE, and hence the absolute values of the model parameters b1_ne and b2_ne are required to be set to smaller values, respectively, in accordance with the increase in the engine speed NE.

Figure 23:
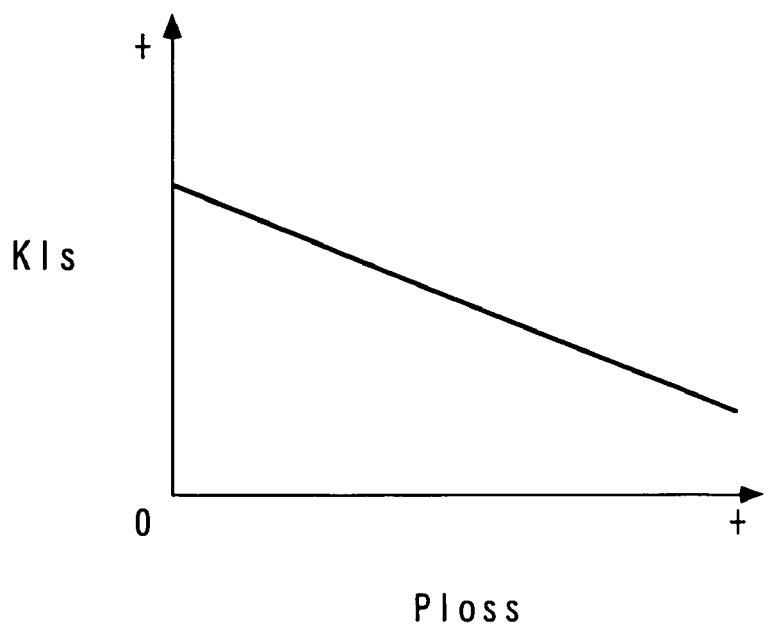
FIG. 23 is a diagram showing an example of a table for use in the calculation of a correction coefficient by the model parameter scheduler of the eighth embodiment.

Further, in the equations (129) and (130), the symbol Kls represents a correction coefficient. The correction coefficient Kls is specifically calculated by searching a table shown in FIG. 23 according to accessory loss Ploss. The accessory loss Ploss represents the energy loss of the engine 3 resulting from operation of accessories or auxiliary machines including an air conditioner. As shown in FIG. 23, the correction coefficient Kls is set to a smaller value as the accessory loss Ploss is larger. This is because as the accessory loss Ploss is larger, the friction of the engine 3 becomes larger, which reduces the change gain of the engine speed NE with respect to the rotational speed control input Une, so that it is required to set the absolute values of the model parameters b1_ne and b2_ne to smaller values in accordance with the decrease in the change gain. In the present embodiment, the engine speed NE and the accessory loss Ploss correspond to the parameters indicative of the state of the controlled object.

In the two-degree-of-freedom response-specifying controller 30G, the rotational speed control input Une is calculated with a target value filter-type two-degree-of-freedom response-specifying algorithm expressed by the following equations (131) to (136):

$$NE\_cmd\_f(k) = -R\_ne \cdot NE\_cmd\_f(k-1) + (1 + R\_ne) \cdot NE\_cmd(k) \tag{131}$$

$$Une(k) = Ueq\_ne(k) + Urch\_ne(k) \tag{132}$$

$$\begin{aligned}Ueq\_ne(k) &= \frac{1}{bl\_ne(k)}\{(1 - a1\_ne(k) - S\_ne) \cdot NE(k) + \\ &\quad (S\_ne - a2\_ne(k)) \cdot NE(k-1) - \\ &\quad b2\_ne(k) \cdot Une(k-1) - c1\_ne(k) - \\ &\quad b1\_ne(k) \cdot c2\_ne(k) + NE\_cmd\_f(k) + \\ &\quad (S\_ne - 1) \cdot NE\_cmd\_f(k-1) - \\ &\quad S\_ne \cdot NE\_cmd\_f(k-2)\} \\ &= \frac{1}{bl\_ne(k)}\{(1 - a1\_ne(k) - S\_ne) \cdot NE(k) + \\ &\quad (S\_ne - a2\_ne(k)) \cdot NE(k-1) - \\ &\quad b2\_ne(k) \cdot Une(k-1) - c1\_ne(k) \\ &\quad NE\_cmd\_f(k) + (S\_ne - 1) \cdot \\ &\quad NE\_cmd\_f(k-1) - S\_ne \cdot \\ &\quad NE\_cmd\_f(k-2)\} - c2\_ne(k)\end{aligned} \tag{133}$$

$$Urch\_ne(k) = -\frac{Krch\_ne}{b1\_ne}\sigma\_ne(k) \tag{134}$$

$$\sigma\_ne(k) = Ene(k) + S\_ne \cdot Ene(k-1) \tag{135}$$

$$Ene(k) = NE(k) - NE\_cmd\_f(k-1) \tag{136}$$

On the other hand, the hybrid disturbance observer 40G calculates the first disturbance estimate c1_ne and the second disturbance estimate c2_ne based on the engine speed NE and the rotational speed control input Une, respectively, as follows: First, the first disturbance estimate c1_ne is calculated with an algorithm as a combination of an estimation algorithm, a rate limit algorithm, and a low-pass filter algorithm as expressed by the following equations (137) to (143):

$$\begin{aligned}NE\_hat(k) &= a1\_ne(k) \cdot NE(k-1) + \\ &\quad a2\_ne(k) \cdot NE(k-2) + b1\_ne(k) \cdot Une(k-1) + \\ &\quad b2\_ne(k) \cdot Une(k-2) + b1\_ne(k) \cdot c2\_ne(k-1)\end{aligned} \tag{137}$$

$$e\_dovne(k) = NE(k) - NE\_hat(k) \tag{138}$$

$$c1\_ne(k) = -Q\_ne \cdot c1\_ne(k-1) + (1 + Q\_ne) \cdot c1\_ne*(k) \tag{139}$$

$$c1\_ne*(k) = c1\_ne*(k-1) + c1\_ne**(k) \tag{140}$$

When $EPS\_ne < e\_dovne(k) - e\_dovne(k-1)$ 
$$c1\_ne**(k) = EPS\_ne \tag{141}$$

When $-EPS\_ne \leq e\_dovne(k) - e\_dovne(k-1) \leq EPS\_ne$
$$c1\_ne**(k) = e\_dovne(k) - e\_dovne(k-1) \tag{142}$$

When $-EPS\_ne > e\_dovne(k) - e\_dovne(k-1)$
$$c1\_ne**(k) = -EPS\_ne \tag{143}$$

Further, the second disturbance estimate c2_ne is calculated with a variable-gain sequential identification algorithm (disturbance estimation algorithm) expressed by the following equations (144) and (145):

$$c2\_ne(k) = \lambda\_ne \cdot c2\_ne(k-1) + \frac{b1\_ne(k) \cdot Pdovne}{1 + b1\_ne(k) \cdot Pdovne \cdot b1\_ne(k)} e\_dovne\_H(k) \tag{144}$$

$$e\_dovne\_H(k) = e\_dovne(k) - c1\_ne(k) \tag{145}$$

According to the controller 1G of the eighth embodiment configured as above, the two disturbance estimates c1_ne and c2_ne are calculated by the hybrid disturbance observer 40G, and the rotational speed control input Une is calculated using the disturbance estimates c1_ne and c2_ne. Therefore, it is possible to obtain the same advantageous effects as provided by the controller 1F of the seventh embodiment.

More specifically, in the steady state where the modeling error is relatively small, the modeling error can be compensated for by the first disturbance estimate c1_ne, while even in the transient state in which the modeling error temporarily assumes an excessively large value, a portion of the modeling error, which cannot be compensated for by the first disturbance estimate c1_ne alone, can be quickly compensated for by the second disturbance estimate c2_ne. Further, since the immediately preceding value c2_ne(k−1) of the second disturbance estimate c2_ne is multiplied by the forgetting coefficient λ_ne in the algorithm for calculating the second disturbance estimate c2_ne, it is possible to avoid interaction between the two disturbance estimates c1_ne and c2_ne.

Additionally, in the controller 1G of the present embodiment, since the model parameter scheduler 60G calculates the model parameters a1_ne and a2_ne according to the engine speed NE, and the model parameters b1_ne and b2_ne according to the engine speed NE and the accessory loss Ploss, it is possible to calculate the two disturbance estimates c1_ne and c2_ne while causing a change in the dynamic characteristic of the controlled object 6 due to changes in the engine speed NE and the accessory loss Ploss, i.e. a change in the dynamic characteristic between the engine speed NE and the rotational speed control input Une, to be quickly reflected in the calculation and quickly compensate for the modeling error by the disturbance estimates c1_ne and c2_ne. With this configuration of the controller 1G of the present embodiment, the stability and control accuracy of the engine speed control system can be further enhanced compared with the controller 1F of the seventh embodiment in which the predetermined fixed values are used as the respective model parameters a1_ne, a2_ne, b1_ne, and b2_ne.

Next, a controller 1H according to a ninth embodiment of the present invention will be described with reference to FIG. 24. Similarly to the above described controllers 1F and 1G, the controller 1H is configured to control the engine speed NE during idling of the engine. The controller 1H is distinguished from the controllers 1F and 1G only by its control algorithm.

Figure 24:
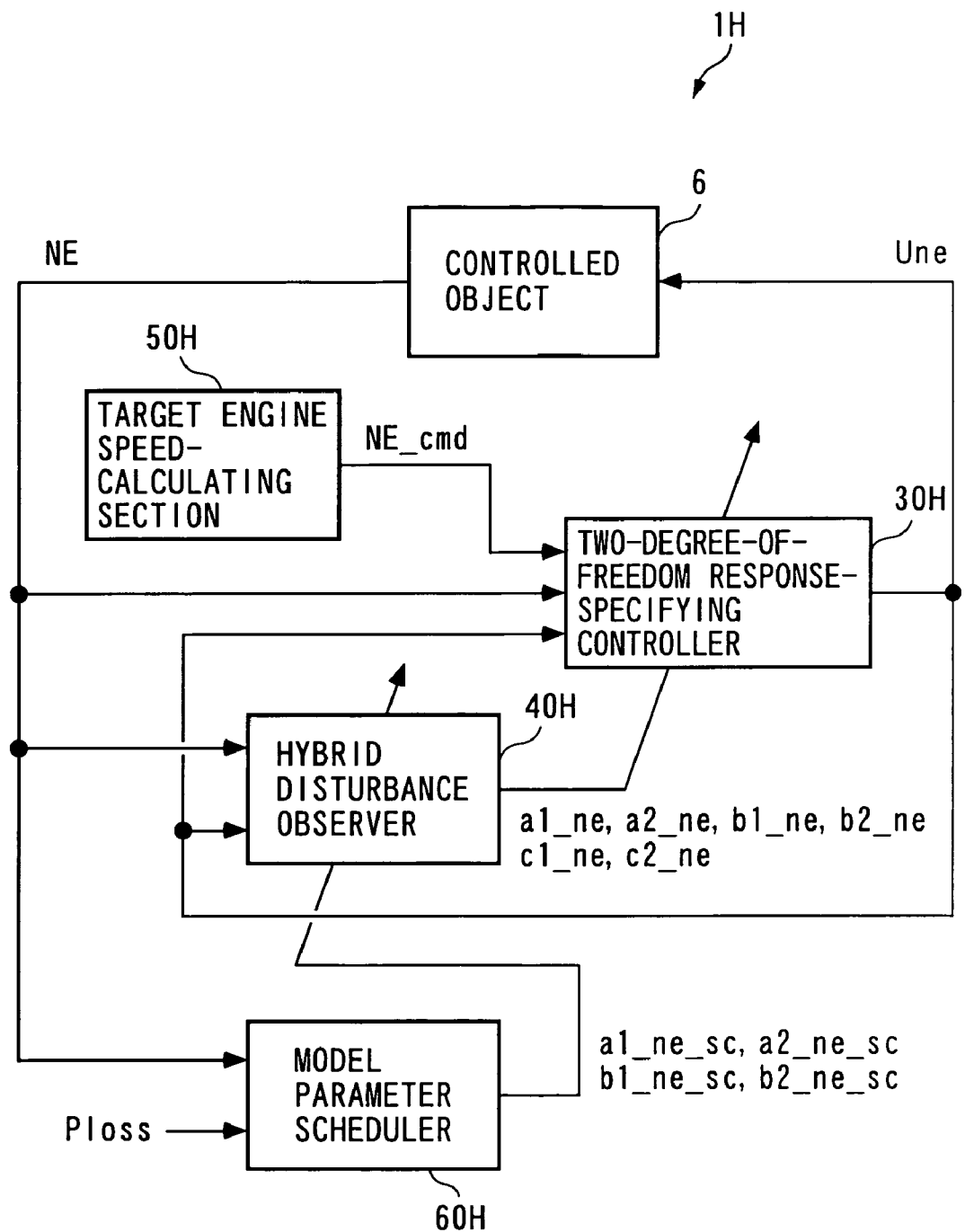
FIG. 24 a schematic block diagram of a controller according to a ninth embodiment.

As shown in FIG. 24, the controller 1H is comprised of a two-degree-of-freedom response-specifying controller 30H, a hybrid disturbance observer 40H, a target engine speed-calculating section 50H, and a model parameter scheduler 60H, which are implemented by the ECU 2. In the present embodiment, the two-degree-of-freedom response-specifying controller 30H corresponds to the control input-calculating means, the hybrid disturbance observer 40H to the estimated control amount-calculating means, the first disturbance estimate-calculating means, the second disturbance estimate-calculating means, and the identification means, and the target engine speed-calculating section 50H to the target control amount-setting means.

First, the target engine speed-calculating section 50H calculates the target engine speed NE_cmd by the same method as used by the target engine speed-calculating section 50F. Further, the model parameter scheduler 60H, first, calculates reference values a1_ne_sc, a2_ne_sc, b1_ne_sc, and b2_ne_sc of the respective model parameters a1_ne, a2_ne, b1_ne, and b2_ne using the following equations (146) to (149), respectively:

$$a1\_ne\_sc(k) = a1\_ne\_base(k) \quad (146)$$

$$a2\_ne\_sc(k) = a2\_ne\_base(k) \quad (147)$$

$$b1\_ne\_sc(k) = b1\_ne\_base(k) \cdot Kls(k) \quad (148)$$

$$b2\_ne\_sc(k) = b2\_ne\_base(k) \cdot Kls(k) \quad (149)$$

In the equations (146) to (149), the retrieved values a1_nea_base, a2_ne_base, b1_ne_base, and b2_ne_base and the correction coefficient Kls are calculated by searching the aforementioned tables in FIGS. 22 and 23, respectively.

Further, in the hybrid disturbance observer 40E, the first disturbance estimate c1_ne, the second disturbance estimate c2_ne, and the model parameters a1_ne, a2_ne, b1_ne, and b2_ne are calculated as follows: First, the first disturbance estimate c1_ne is calculated with an algorithm as a combination of an estimation algorithm, a rate limit algorithm, and a low-pass filter algorithm as expressed by the following equations (150) to (158):

$$\theta ne^T(k) = [a1\_ne(k), a2\_ne(k), b1\_ne(k), b2\_ne(k), c2\_ne(k)] \quad (150)$$

$$\zeta ne^T(k) = [NE(k-1), NE(k-2), \quad (151)$$
$$Une(k-1), Une(k-2), b1\_ne(k-1)]$$

$$NE\_hat(k) = \theta ne^T(k-1) \cdot \zeta ne(k) = a1\_ne(k-1) \cdot NE(k-1) + \quad (152)$$
$$a2\_ne(k-1) \cdot NE(k-2) + b1\_ne(k-1) \cdot Une(k-1) +$$
$$b2\_ne(k-1) \cdot Une(k-2) + b1\_ne(k-1) \cdot c2\_ne(k-1)$$

$$e\_dovne(k) = NE(k) - NE\_hat(k) \quad (153)$$

$$c1\_ne(k) = -Q\_ne \cdot c1\_ne(k-1) + (1 + Q\_ne) \cdot c1\_ne*(k) \quad (154)$$

$$c1\_ne*(k) = c1\_ne*(k-1) + c1\_ne**(k) \quad (155)$$

When $EPS\_ne < e\_dovne(k) - e\_dovne(k-1)$ \quad (156)
$$c1\_ne**(k) = EPS\_ne$$

When $-EPS\_ne \leq e\_dovne(k) - e\_dovne(k-1) \leq EPS\_ne$ \quad (157)
$$c1\_ne**(k) = e\_dovne(k) - e\_dovne(k-1)$$

When $-EPS\_ne > e\_dovne(k) - e\_dovne(k-1)$ \quad (158)
$$c1\_ne**(k) = -EPS\_ne$$

On the other hand, the second disturbance estimate c2_ne is calculated with a variable-gain sequential identification algorithm (disturbance estimation algorithm) to which the δ correcting method is applied. The algorithm is expressed by the following equations (159) to (164). That is, the hybrid disturbance observer 40H also functions as an onboard identifier.

$$\theta ne(k) = \theta nesc(k) + d\theta ne(k) \quad (159)$$

$$d\theta ne(k) = \delta ne \cdot d\theta ne(k-1) + \frac{Pne \cdot \zeta ne(k)}{1 + \zeta ne^T(k) \cdot Pne \cdot \zeta ne(k)} e\_dovne\_H(k) \quad (160)$$

$$e\_dovne\_H(k) = e\_dovne(k) - c1\_ne(k) \quad (161)$$

$$\theta nesc^T(k) = [a1\_ne\_sc(k), \quad (162)$$
$$a2\_ne\_sc(k), b1\_ne\_sc(k), b2\_ne\_sc(k), 0]$$

$$d\theta ne^T(k) = [da1\_ne(k), da2\_ne(k), db1\_ne(k), db2\_ne(k), dc2\_ne(k)] \quad (163)$$

-continued $$\delta ne = \begin{bmatrix} \delta ne1 & 0 & 0 & 0 & 0 \\ 0 & \delta ne2 & 0 & 0 & 0 \\ 0 & 0 & \delta ne3 & 0 & 0 \\ 0 & 0 & 0 & \delta ne4 & 0 \\ 0 & 0 & 0 & 0 & \delta ne5 \end{bmatrix} \quad (164)$$

In the equation (159), the symbol θnesc represents a reference-value vector of the model parameters whose transposed matrix is defined by the equation (162). Further, the symbol dθne represents a correction-term vector whose transposed matrix is defined by the equation (163). The symbols da1_ne, da2_ne, db1_ne, db2_ne, and dc2_ne in the equation (163) represent respective correction terms of the model parameters a1_ne, a2_ne, b1_ne, and b2_ne and the second disturbance estimate c2_ne. The correction-term vector dθne is calculated using the equation (160). In the equation (160), the symbol Pne represents a fixed identification gain, and the symbol δne represents a forgetting-coefficient vector defined by the equation (164). The symbol δnei (i=1 to 5) in the equation (164) represents the forgetting coefficient. The forgetting coefficient δnei is set such that the relationship of 0<δcai<1 holds. It should be noted that if the forgetting effect provided by the forgetting-coefficient vector δne is not necessary, the forgetting coefficient δnei may be set to 1.

In the two-degree-of-freedom response-specifying controller 30H, the rotational speed control input Une is calculated with the same control algorithm (i.e. the aforementioned equations (131) to (136)) as used by the two-degree-of-freedom response-specifying controller 30G.

According to the controller 1H of the ninth embodiment configured as above, the two disturbance estimates c1_ne and c2_ne are calculated by the hybrid disturbance observer 40H, and the rotational speed control input Une is calculated using the disturbance estimates c1_ne and c2_ne. Therefore, similarly to the controllers 1F and 1G, it is possible to compensate for the modeling error not only in the steady state where the modeling error is relatively small, by the first disturbance estimate c1_ne, but also in the transient state where the modeling error temporarily assumes an excessively large value, by quickly compensating for a portion of the modeling error, which cannot be quickly compensated for by the first disturbance estimate c1_ne alone, by the second disturbance estimate c2_ne.

Further, in the algorithm for calculating the second disturbance estimate c2_ne, the reference value of the second disturbance estimate c2_ne in the reference-value vector θnesc is set to 0, and in the equation (160), the immediately preceding value dc2_ne(k−1) of the correction term of the second disturbance estimate is multiplied by the forgetting coefficient δne5. Therefore, owing to the forgetting effect provided by the forgetting coefficient δne5, the correction term dc2_ne of the second disturbance estimate progressively converges to a value of 0 as the computation proceeds, and finally the second disturbance estimate c2_ne converges to its reference value set to 0. As a consequence, interaction between the two disturbance estimates c1_ne and c2_ne can be avoided similarly to the above described controller 1G.

Further, in the controller 1H, the hybrid disturbance observer 40H also functions as an onboard identifier as described above, and the model parameters a1_ne, a2_ne, b1_ne, and b2_ne are identified onboard with the variable-gain sequential identification algorithm to which the δ correcting method is applied. Therefore, even when the dynamic characteristic of the controlled object 6 changes due to aging of the throttle valve mechanism 90 or variation between individual products thereof, it is possible to calculate the model parameters a1_ne, a2_ne, b1_ne, and b2_ne while causing the change in the dynamic characteristic to be quickly reflected in the calculation. With this configuration of the controller 1H of the present embodiment, the stability and control accuracy of the engine rotational sped control system can be further enhanced compared with the controller 1G of the eighth embodiment which uses the model parameters a1_ne, a2_ne, b1_ne, and b2_ne set by the model parameter scheduler 60G.

Although in the above described embodiments, the controller of the present invention is applied to the controlled objects in which the fuel pressure Pf, the cam phase Cain, and the engine speed NE are used as control amounts, respectively, this is not limitative, but it is to be understood that the controller can be applied to various industrial apparatuses or machines having the characteristic that a modeling error temporarily increases sharply due to an excessively large disturbance or a sudden change in a target control amount.

Further, although in the above described embodiments, the forgetting coefficients λ, λ_ca, λ_ne, δ5, δca5, and δne5 are used in the respective disturbance estimation algorithms so as to impart a forgetting effect to the second disturbance estimates c2, c2_ca, and c2_ne, this is not limitative, but any forgetting algorithm which is capable of imparting a forgetting effect to the second disturbance estimates c2, c2_ca, and c2_ne may be employed.

It is further understood by those skilled in the art that the foregoing are preferred embodiments of the invention, and that various changes and modifications may be made without departing from the spirit and scope thereof.

What is claimed is:

1. A controller comprising:
    control amount-detecting means for detecting a control amount of a controlled object;
    target control amount-setting means for setting a target control amount as a target of the control amount;
    estimated control amount-calculating means for calculating an estimate of the control amount as an estimated control amount, with a predetermined estimation algorithm based on a controlled object model obtained by modeling the controlled object;
    first disturbance estimate-calculating means for calculating a first disturbance estimate by carrying out processing including at least one of a predetermined filtering process, a predetermined limiting process, and a predetermined gain-setting process on a first difference as a difference between the detected control amount and the calculated estimated control amount;
    second disturbance estimate-calculating means for calculating a second disturbance estimate based on a second difference as a difference between the first difference and the calculated first disturbance estimate, with a predetermined disturbance estimation algorithm; and
    control input-calculating means for calculating a control input to the controlled object based on the calculated first disturbance estimate, the calculated second disturbance estimate, and the detected control amount, with a predetermined control algorithm, such that the control amount converges to the target control amount.

2. A controller as claimed in claim 1, further comprising model parameter-setting means for setting model parameters of the controlled object model according to a state of the controlled object, and wherein said control input-calculating means calculates the control input further based on the set parameters, with the predetermined control algorithm.

3. A controller as claimed in claim 1, further comprising identification means for identifying model parameters of the controlled object model with a predetermined sequential identification algorithm, and wherein said control input-calculating means calculates the control input further based on the identified parameters, with the predetermined control algorithm.

4. A controller as claimed in claim 1, wherein the predetermined disturbance estimation algorithm includes a forgetting algorithm for imparting a forgetting effect to the second disturbance estimate.

5. A controller as claimed in claim 1, wherein the control amount is a fuel pressure in a fuel supply system of an internal combustion engine.

6. A controller as claimed in claim 1, wherein the control amount is a cam phase of at least one of an intake cam and an exhaust cam of an internal combustion engine, for opening and closing an intake valve and an exhaust valve, respectively, with respect to a crankshaft.

7. A controller as claimed in claim 1, wherein the control amount is a rotational speed of an internal combustion engine.

* * * * *